(12) United States Patent
Felker

(10) Patent No.: US 12,268,931 B2
(45) Date of Patent: *Apr. 8, 2025

(54) EXERCISE SYSTEM

(71) Applicant: Thomas S. Felker, Manson, WA (US)

(72) Inventor: Thomas S. Felker, Manson, WA (US)

( * ) Notice: Subject to any disclaimer, the term of this patent is extended or adjusted under 35 U.S.C. 154(b) by 997 days.

This patent is subject to a terminal disclaimer.

(21) Appl. No.: 17/222,191

(22) Filed: Apr. 5, 2021

(65) Prior Publication Data
US 2021/0268333 A1  Sep. 2, 2021

Related U.S. Application Data

(63) Continuation-in-part of application No. 17/195,034, filed on Mar. 8, 2021, now Pat. No. 11,951,375, and
(Continued)

(51) Int. Cl.
*A63B 23/035* (2006.01)
*A63B 22/00* (2006.01)
(Continued)

(52) U.S. Cl.
CPC ...... *A63B 23/03583* (2013.01); *A63B 22/001* (2013.01); *A63B 22/0087* (2013.01);
(Continued)

(58) Field of Classification Search
None
See application file for complete search history.

(56) References Cited

U.S. PATENT DOCUMENTS

| | | |
|---|---|---|
| 535,256 A | 3/1895 | Marty |
| 581,985 A | 5/1897 | Fritz |

(Continued)

FOREIGN PATENT DOCUMENTS

| | | |
|---|---|---|
| DE | 8708478 | 8/1987 |
| DE | 102010034035 | 2/2012 |

(Continued)

OTHER PUBLICATIONS

Felker, Thomas S., Dual Powered Propulsion System, Patent Cooperation Treaty Application Serial No. PCT/US15/26137, filed Apr. 16, 2015, International Search Report and Written Opinion dated Jul. 10, 2015.

(Continued)

*Primary Examiner* — James B Hull
(74) *Attorney, Agent, or Firm* — Schmeiser, Olsen & Watts LLP

(57) ABSTRACT

The function of this invention is to provide exercisers with a safe and easy way to convert a legs-only exercising device, such as a stationary trainer or bicycle, with the capacity to exercise their upper and lower body muscle groups simultaneously or separately. This invention is portable and can be moved easily from one legs-only exercising device to another. Once they are mounted onto the handlebar or attachment bar of the legs-only device, it is now a full-body trainer. Exercisers mount the trainer, place their feet on the cycling pedals, place their elbows onto the elbow holders, grasp the hand grips, and now start their full body exercising activity. The degree of difficulty of their exercise trek is easily accommodated by allowing the rider to adjust the resistance for moving the forearm bars up and down for an upright bike, or back and forth for a recumbent trainer.

13 Claims, 17 Drawing Sheets

Related U.S. Application Data a continuation-in-part of application No. 16/798,903, filed on Feb. 24, 2020, now Pat. No. 11,013,955, which is a continuation of application No. 15/683,535, filed on Aug. 22, 2017, now Pat. No. 10,569,129, said application No. 17/195,034 is a continuation of application No. 15/683,509, filed on Aug. 22, 2017, now Pat. No. 10,946,263, said application No. 15/683,535 is a continuation-in-part of application No. 15/484,519, filed on Apr. 11, 2017, now Pat. No. 10,569,827.

(60) Provisional application No. 63/004,895, filed on Apr. 3, 2020, provisional application No. 62/377,847, filed on Aug. 22, 2016, provisional application No. 62/377,837, filed on Aug. 22, 2016, provisional application No. 62/323,447, filed on Apr. 15, 2016.

(51) Int. Cl.
*A63B 22/06* (2006.01)
*A63B 23/02* (2006.01)
*B62K 21/12* (2006.01)
*B62M 1/12* (2006.01)
*B62M 1/26* (2013.01)
*B62M 3/14* (2006.01)
*B62M 15/00* (2006.01)
*B62M 23/00* (2006.01)
*A63B 21/04* (2006.01)
*A63B 21/22* (2006.01)
*B62M 3/00* (2006.01)
*B62M 9/00* (2006.01)

(52) U.S. Cl.
CPC ...... *A63B 22/0605* (2013.01); *A63B 23/0222* (2013.01); *B62K 21/125* (2013.01); *B62M 1/12* (2013.01); *B62M 1/26* (2013.01); *B62M 3/14* (2013.01); *B62M 15/00* (2013.01); *B62M 23/00* (2013.01); *A63B 21/0435* (2013.01); *A63B 21/225* (2013.01); *B62M 2003/006* (2013.01); *B62M 2009/005* (2013.01)

(56) References Cited

U.S. PATENT DOCUMENTS

| | | |
|---|---|---|
| 619,637 A | 2/1899 | Tucker |
| 690,180 A | 12/1901 | Pierson |
| 2,232,120 A | 2/1941 | Letsch |
| 2,416,092 A | 2/1947 | Ernest |
| 2,510,013 A | 5/1950 | Edgar |
| 3,800,866 A | 4/1974 | Ireland et al. |
| 3,913,945 A | 10/1975 | Clark |
| 3,921,464 A | 11/1975 | Greseth |
| 3,978,919 A | 9/1976 | Fachbach et al. |
| 4,062,401 A | 12/1977 | Rudny et al. |
| 4,136,735 A | 1/1979 | Beck et al. |
| 4,180,130 A | 12/1979 | Beck et al. |
| 4,181,172 A | 1/1980 | Longhouse |
| 4,184,541 A | 1/1980 | Beck et al. |
| 4,329,946 A | 5/1982 | Longhouse |
| 4,524,987 A | 6/1985 | Kim |
| 4,541,647 A | 9/1985 | Braun |
| 4,602,781 A | 6/1986 | La Marsh et al. |
| 4,685,692 A | 8/1987 | Fullilove et al. |
| 4,726,600 A | 2/1988 | Wu |
| 4,861,055 A | 8/1989 | Jones |
| 4,923,193 A | 5/1990 | Pitzen et al. |
| 5,184,838 A | 2/1993 | Becoat |
| 5,246,343 A | 9/1993 | Windsor et al. |
| 5,253,889 A | 10/1993 | Kaminski |
| 5,272,928 A | 12/1993 | Young |
| 5,304,104 A | 4/1994 | Chi |
| 5,324,057 A | 6/1994 | Chartrand |
| 5,328,195 A | 7/1994 | Sommer et al. |
| 5,330,218 A | 7/1994 | Escudero |
| 5,332,244 A | 7/1994 | Turner et al. |
| 5,372,374 A | 12/1994 | Hudson |
| 5,390,946 A | 2/1995 | Spicer |
| 5,429,379 A | 7/1995 | Grigoriev |
| 5,501,648 A | 3/1996 | Grigoriev |
| 5,785,336 A | 7/1998 | Jang |
| 5,829,772 A | 11/1998 | Jones |
| 5,881,685 A | 3/1999 | Foss et al. |
| 5,943,986 A | 8/1999 | Kern et al. |
| 6,032,970 A | 3/2000 | Porter |
| 6,068,279 A | 5/2000 | Dion |
| 6,105,985 A | 8/2000 | Cosgrave |
| 6,161,854 A | 12/2000 | Christini et al. |
| 6,161,855 A | 12/2000 | Christini et al. |
| 6,182,991 B1 | 2/2001 | Christini et al. |
| 6,193,253 B1 | 2/2001 | Barnett |
| 6,386,839 B1 | 5/2002 | Chuang |
| 6,406,047 B1 | 6/2002 | Sawyer, Jr. |
| 6,439,592 B1 | 8/2002 | Christini et al. |
| 6,659,724 B2 | 12/2003 | Takeuchi et al. |
| 6,676,371 B1 | 1/2004 | Brown |
| 6,688,623 B1 | 2/2004 | Yunaska |
| 6,827,362 B2 | 12/2004 | Smith et al. |
| 6,986,520 B2 | 1/2006 | Smith et al. |
| 7,021,639 B2 | 4/2006 | Park |
| 7,040,260 B2 | 5/2006 | Yoshimatsu et al. |
| 7,201,389 B2 | 4/2007 | Smith et al. |
| 7,413,206 B2 | 8/2008 | Pena et al. |
| 7,497,806 B2 | 3/2009 | Duncan et al. |
| 7,682,286 B2 | 3/2010 | Badarneh et al. |
| 7,698,967 B2 | 4/2010 | Ording |
| 7,752,767 B2 | 7/2010 | Mandaric |
| 7,833,129 B2 | 11/2010 | Badameh et al. |
| 7,870,809 B2 | 1/2011 | Rice |
| 7,891,686 B1 | 2/2011 | Crawford |
| 7,896,375 B2 | 3/2011 | Cynn |
| 7,963,889 B2 | 6/2011 | Badareh et al. |
| 7,967,314 B1 | 6/2011 | Mirabile |
| 8,056,916 B2 | 11/2011 | Hudgin |
| 8,157,280 B2 | 4/2012 | Drymalski |
| 8,172,247 B2 | 5/2012 | Weber |
| 8,181,977 B1 | 5/2012 | Bartlett |
| 8,186,699 B2 | 5/2012 | Green |
| 8,220,578 B2 | 7/2012 | Kerschgens Long |
| 8,562,488 B2 * | 10/2013 | Alberts ............... A63B 24/0062 482/901 |
| 8,562,495 B2 | 10/2013 | Ladd et al. |
| 8,608,622 B2 | 12/2013 | Alberts |
| 8,876,663 B2 | 11/2014 | Alberts |
| 2003/0125167 A1 | 7/2003 | Copeland |
| 2004/0113384 A1 | 6/2004 | Park |
| 2005/0044981 A1 | 3/2005 | Huang |
| 2007/0114086 A1 | 5/2007 | Glessner |
| 2008/0193286 A1 | 8/2008 | Kakishita et al. |
| 2008/0210409 A1 | 9/2008 | Saksager |
| 2009/0212524 A1 | 8/2009 | Lee |
| 2011/0148068 A1 | 6/2011 | Hunt |
| 2012/0272777 A1 | 11/2012 | Tolhurst |
| 2012/0295770 A1 | 11/2012 | Lo |
| 2012/0299267 A1 | 11/2012 | Zacchi |
| 2015/0367900 A1 | 12/2015 | Haan |
| 2018/0161658 A1 | 6/2018 | Felker |
| 2021/0268360 A1 | 9/2021 | Felker |

FOREIGN PATENT DOCUMENTS

| | | |
|---|---|---|
| EP | 91107605.7 | 11/1991 |
| FR | 2686305 | 7/1993 |
| WO | 0222436 | 3/2002 |

OTHER PUBLICATIONS

Magnetic Recumbent Exercise Bike, Sunny Health Fitness, https://sunnyhealthfitness.com/collections/recumbent-bikes/products/sunny-

(56) References Cited

OTHER PUBLICATIONS health-and-fitness-sf-rb4631-magnetic-recumbent-bike-exercise-bike-350lb-high-weight-capacity-arm-exercisers-monitor-pulse-rate-monitoring.

Felker, Exercise System, Patent Cooperation Treaty application serial No. PCT/US2022/014770, filed on Feb. 1, 2022, International Search Report and Written Opinion dated Jun. 6, 2022.

* cited by examiner

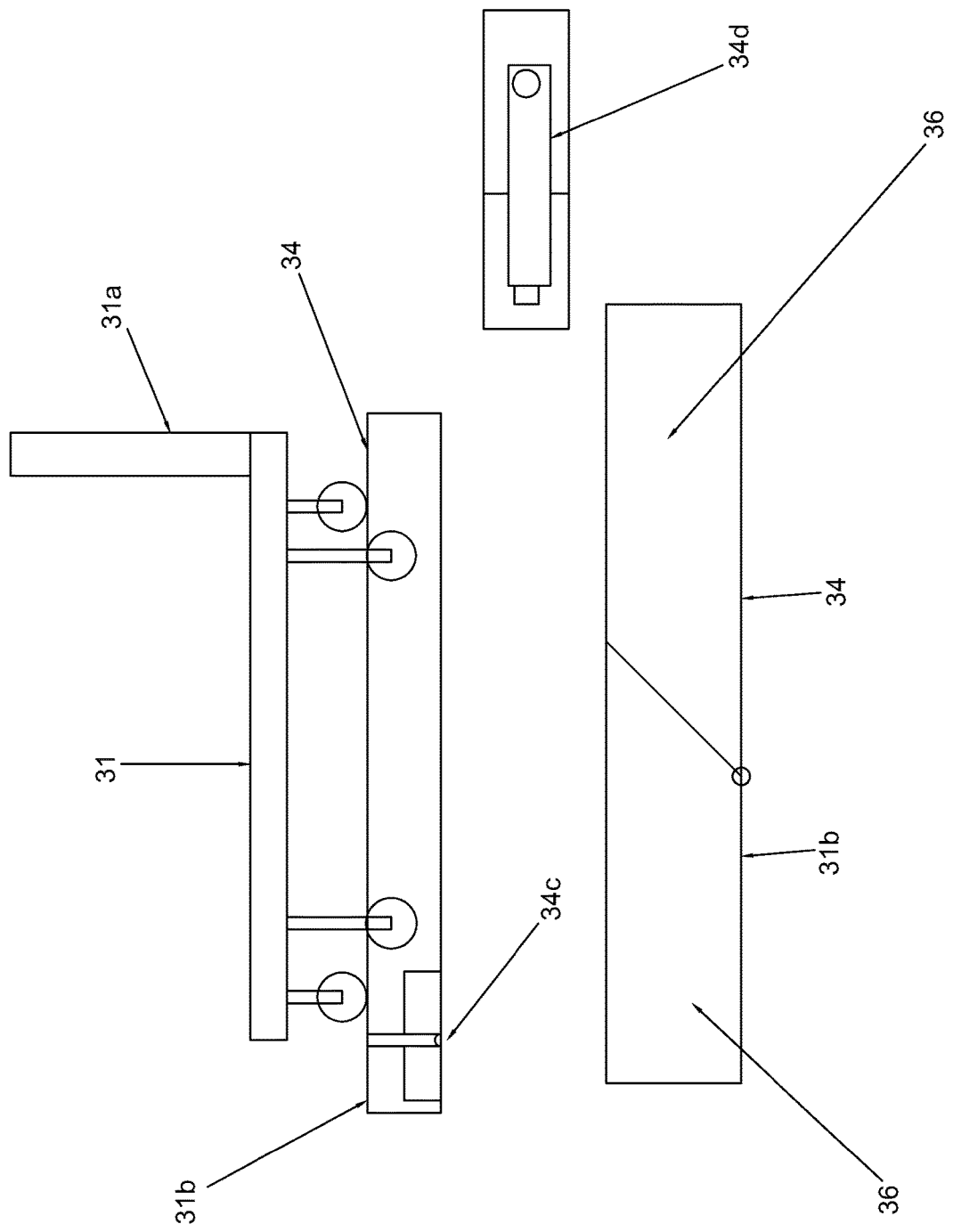

EXERCISE SYSTEM

CROSS REFERENCE TO RELATED APPLICATION[S]

This application claims priority to U.S. Provisional Patent Application Ser. No. 63/004,895, filed Apr. 3, 2020, the disclosure of which is incorporated entirely herein by reference. This application is also a continuation-in-part of U.S. patent application Ser. No. 16/798,903, filed Feb. 24, 2020, which is a continuation of U.S. patent application Ser. No. 15/683,535, filed Aug. 22, 2017, now U.S. Pat. No. 10,569,129, which is a continuation-in-part of U.S. patent application Ser. No. 15/484,519, filed Apr. 11, 2017, now U.S. Pat. No. 10,569,827, which claims priority to U.S. Provisional Patent Application Ser. No. 62/323,447, filed Apr. 15, 2016, and Ser. No. 15/683,535 claims priority to U.S. Provisional Patent Application Ser. No. 62/377,847, filed Aug. 22, 2016, and Ser. No. 15/683,535 claims priority to U.S. Patent Application Ser. No. 62/377,837, filed on Aug. 22, 2016, the disclosures of which are hereby incorporated entirely herein by reference. Additionally, this application is also a continuation-in-part of U.S. patent application Ser. No. 17/195,034, filed on Mar. 8, 2021, which is a continuation of U.S. patent application Ser. No. 15/683,509, filed on Aug. 22, 2017, now U.S. Pat. No. 10,946,263, the disclosures of which are incorporated entirely herein by reference.

BACKGROUND OF THE INVENTION

Technical Field

This invention relates generally to an exercise system and more particularly an exercise system with adjustable resistance devices that can be used to exercise the hands, arms, shoulders, upper back, lower back, core, outer chest muscles and legs.

State of the Art

Most human powered stationary cycling trainers do not have combined arms, legs, shoulders, back, and core means for riders to aerobically and anaerobically exercise their bodies while exercising in a recumbent position. And the inventor is not aware of any portable upper body resistance exercise device that is easily detachable from the handlebars of one bicycle, and then immediately attach it onto the handlebars of another bicycle or training device. Examples of earlier attempts of providing hands and legs upright cycle training include USPTO #8,562,495 B2 by Ladd and Ladd as inventors. In their patent, exercisers ride a stationary trainer, and while pedaling the pedals, or not pedaling, they can pull-up with their hands on one or two handles connected to ropes that are wound-around a spindle inside a box, located on the front end of the trainer. The box also contains resistance making components and a transmission to transfer the resistance from one cable to another. The Ladd design is not remotely related to the instant invention because no cables are used with the new HANDLEBAR ATTACHMENT RESISTANCE DEVICE invention offered herein.

Another example of an upper body invention being used with a stationary trainer is USPTO #5,304,104 A by Wu, Chi H. The Wu patent is also completely different than the instant HANDLEBAR ATTACHMENT RESISTANCE DEVICE. The Wu invention describes a dynamic physical fitness device that includes a motor, output shaft, and 2 timing wheels, amongst its other parts. The invention described herein does not use any such parts nor operating characteristics.

The only known competing recumbent full-body competitor is the recumbent full-body cycling ergometer. There are many manufacturers of such devices, but one such manufacturer is Sunny Health and Fitness with its Magnetic Recumbent Full-body Ergometer.

There is a need for an improved exercise system that can provide full body physical fitness.

SUMMARY OF THE INVENTION

Despite the above-described prior art, the current cycling ergometers are not as desirable as the instant invention with which to exercise for the following reasons:
  a. Exercisers cannot input as much energy into the recumbent full-body ergometer, compared to the instant lineal push-pull invention. This is because energy inputted into a circular geometric shape is not as efficiently used as that inputted lineally in a straight-line format;
  b. The invention described herein is ON DEMAND. The upper body exercising equipment is only used when exercisers desire to use Full-Body arms and legs together or separately;
  c. In both the "Up-Down" MPC Drive Train attached to the Handlebars, and the "Push-Pull" Recumbent Linear MPC Drive Train Assembly, riders have more stability because both arms move in the same direction in unison, at the same time, as opposed to the herky-jerky movement of an air dyne or a recumbent ergometer.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

In FIG. 6a, the Clasp that operatively attaches the Resistance Device directly onto the Handlebars of the bicycle is open, and in FIG. 6b the Clasp is closed and has operatively attached the Handlebar Attachment Resistance Device to the handlebars of the bicycle. A connecting strap is also shown in one of these drawings. This strap can be made of varied materials, such as rubber. It is attached on one end to the Assembly Bracket, and the other end can wrap around a frame component of the bike frame, such as head tube, and then be pulled taught back onto the Bracket.

FIG. 14 is a Top and Side View of the Hinge and Rear end of the Swinging Horizontal Support Bar attached to the stationary Horizontal Support Bar and shows a diagonally cut top plate at the joined ends of these 2 Horizontal Support Bars causing a smooth transition for the sliding seat as it rolls over the joint of these 2 horizontal support bars during a rowing stroke.

LIST OF PARTS USED IN INVENTION AND LOCATED IN DRAWINGS

List of the Invention's Component Parts

Part #/Part Name or Description

Figure 1:
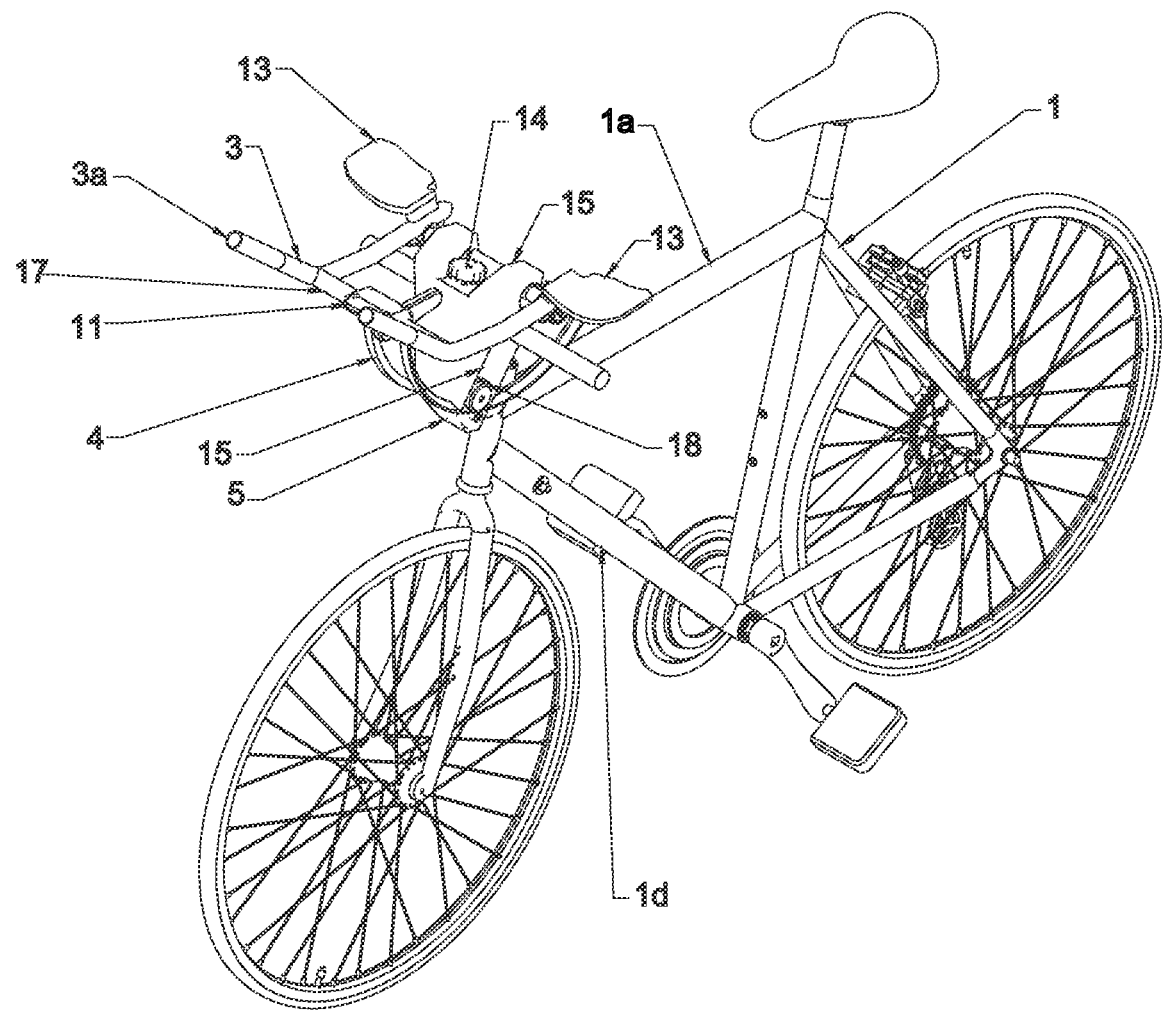
FIG. 1 shows an oblique frontal perspective illustrating an example of a road bike with a Handlebar Attached Resistance Device attached to the handlebars.

1) Bicycle Frame
   1a) Top Tube
   1b) Head Tube
   1c) Down Tube
   1d) Post Tube
2) Bicycle Handlebar
3) Forearm Bars
   3a) Hand Grips
4) "Push-Pull" or "Up-Down" Multi-Power Cycle (MPC) Drive Train Assembly
5) Movable Resistance Rod
   5a) Perpendicular attached Handlebar with the Moveable Resistance Rod
6) Adjustable Pressure Mechanism-non-limiting examples are wheels, permanent magnet, an electro-magnet, or resistance motor
7) Attachment Assembly Bracket that attaches the Assembly to the Handlebars
   7a) Handlebar Clasps
8) Lower Bracket Attachment Strap attaching the Assembly Bracket to the Front Frame, such as to the Head Tube
9) Stem
10) Stem Quill
11) Attachment bracket for connecting the Moveable Resistance Rod to the forearm bars and yoke
12) Bearings for rotation of forearm bars over their fulcrum rod
13) Elbow Rests
14) Resistance Pressure Regulating Knob and Rod
15) Forearm Bar Fulcrum
16) Handlebar Orifice
17) Yoke
18) Axle holding the pressure adjustment wheel in place in the Adjustable Pressure Mechanism Parts for Recumbent Installed "Push-Pull" Drive Train Assembly and Housing 19) Recumbent Multi-Power Cycle (MPC) Trainer or Combination Rower
20) "Push-Pull" or "Up-Down" MPC Drive Train Bracket Attached to "Hand Holder" of a standard recumbent stationary cycle;
21) The resistance device assembly is operatively similar to the parts previously described for the upright bike, (part #'s 4, 5, 13, 15, and 18);
22) Bracket holding the "Push-Pull" MPC Drive Train Assembly and its Housing onto the console of a recumbent cycling trainer;
23) Handlebar that pushes and pulls the connected Moveable Resistance Rod in and out of the Adjustable Pressure Mechanism to make resistance for the back-and-forth movement of the recumbent cycling exerciser—the pressure can be made from such things as adjustable resistance wheels, adjustable resistance permanent magnets, or electro-magnet;
24) Bracket that houses the "Push-Pull" MPC Drive Train Assembly and connects this Assembly to a Recumbent Stationary Trainer;

25) Pedals mounted next to Cranks on Recumbent Full-Body Cycling Trainer or regular bicycle;

Parts for the Combined Multi-Power Cycle and Rower

26) Extended Crank Axle
27) Footrests
   27a) Footrests with Cycling Shoe Clips
   27b) Footrests with Cycling Shoe Baskets
28) Outboard Cycling Pedals for use on Combined MPC Training Cycle and Rower
29) "Push-Pull" MPC Drive Train Assembly for Recumbent Trainer or Rower. The resistance device assembly is operatively similar to the parts previously described for the upright bike, (part #'s 4,5, 6, and 18)
   29a) Housing for "Push-Pull" MPC Drive Train Assembly
30) Alternative Standard Rotary Resistance Creating Device
   a) Handle used by rowers to pull-out the rope under resistance
31) Seat for Rower and Recumbent MP Cycling Trainer
   31a) Removeable Seat Back for Rower
   31b) Stationary seat support bar upon which riders slide the seat into a comfortable position
   31c) Hand Holder attached to both sides of seat of a stationary trainer
32) Linear Bearings to hold in position the Moveable Resistance Rod
33) Spring-loaded block to keep pressure and resistance on the lower set of wheels or permanent magnets relative to the Moveable Resistance Rod
34) Swinging Horizontal Bar Support for Sliding Seat Requirement on a Rower. It swings horizontally from the "open" position to the "closed" position and vice versa. Once in the "closed" position, an exerciser would mount the seat of a combined stationary MPC recumbent trainer and rower and begin the rowing stroke.
   34a) Front end of Circularly Cut Swinging Sliding Seat Horizontal Bar Support
   34b) Front end of Diagonally Cut Swinging Sliding Seat Horizontal Bar Support
   34c) Hinge upon which the Swinging Horizontal Bar Support swings open, to permit riders to walk in front of the seat and sit down, and closed to allow rowers to slide the seat back and forth as they perform a rowing stroke using good technique
   34d) Illustrates a longitudinal support component 34d that is installed into a cut-out in the side of the stationary and swinging support bar when it is closed, and the exerciser is sliding the rowing seat back and forth over these roller supports 34 and 31b
   34e) This component is a locking mechanism that pierces through both 34 and 35 at their interface when the Swinging Horizontal Bar Support 34 is swung into the closed position and keeps this swinging support bar locked in place into its vertical support 35
35) Vertical Support Piece to Support the weight of Rowers as they slide back and forth over the Sliding Seat Horizontal Bar Support positioned in the previously "opened space" of the trainer
   35a Top View of the Rear End of circularly cut Vertical Support Piece to Support the weight of Rowers as they slide back and forth over the Sliding Seat Horizontal Bar Support positioned in the previously "opened space" of the trainer
   35b) Side View of the Rear End of diagonally cut Vertical Support Piece to Support the weight of Rowers as they slide back and forth over the Sliding Seat Horizontal Bar Support positioned in the previously "opened space" of the trainer.
36) Top plate that fits over and lays on top of both the rear Stationary Sliding Seat Support and the Swinging Horizontal Bar Support and is cut into 2 pieces in a diagonal shape at the location of the hinge over which the Swinging Horizontal Bar Support rotates from the open to closed position. This allows the sliding seat to roll smoothly over the joint between these 2 horizontal support bars.

DETAILED DESCRIPTION OF EMBODIMENTS OF THE INVENTION

In the following description and accompanying drawings, like numbers refer to like parts whenever they occur. In addition, while the following enablement refers to many component parts of the invention operating at specific positions within the overall system, some of these parts may be shifted to different locations within the overall system and still maintain complete functionality.

MPC Drive Train Assembly

The Full-Body physical fitness exercise invention described herein relates generally to adjustable resistance devices that can be used to exercise the hands, arms, shoulders, upper back, lower back, core, outer chest muscles and legs. These applications are made possible because of the application of a new MPC drive train assembly that uses "push and pull" or "up and down" physical action produced by the arms, shoulders, back, core, or legs of exercisers on a handlebar or set of forearm bars. The purpose of this invention, the "Push-Pull" or "Up-Down" MPC Drive Train Assembly 4 is to provide the means for developing aerobic exercise equipment 1, that is different and more efficient than that which is on the market today. (See FIGS. 1-14) This goal is accomplished primarily by developing Full-Body exercise equipment in which exercisers energize muscle groups in both their upper and lower body. One of the new applications for the "Up-Down" MPC Drive Train Assembly 4, invention is to use it in conjunction with a rear wheel trainer. This allows riders to attach an aerobic training device 4 onto the handlebars 2, of an outdoor bicycle 1, or onto the Hand Holder of a recumbent stationary cycle 31c and exercise their upper body muscle groups while simultaneously exercising their legs. When bicycle riders are done exercising indoors, they just dismount from their outdoor bike, 1, remove their bike 1 from their rear wheel trainer, loosen and remove the "Up-Down" MPC Drive Train Assembly 4 from the handlebars 2, and head tube, 1b, and then take this same bike 1, outside and ride it outside on the roads or trails. (See FIGS. 1, 2, 13)

This new "Push-Pull" or "Up-Down" MPC Drive Train Assembly 4 has a moving plunger or resistance rod 5 that is operatively connected to a set of moving handlebars 2 or forearm bars 3. The plunger or resistance rod 5 is pushed and pulled through an Adjustable Pressure Mechanism 6 that creates resistance by pushing and pulling the Moveable Resistance Rod 5 through the adjustable pressure mechanism that may include component part such as, but not limited to, a set of adjustable wheels (see FIGS. 1-6), permanent magnets, or an electro-magnet (see FIGS. 7, 8, 8a and 13 for magnets or the electro-magnet).

In some applications, as shown in FIGS. 1-6, the MPC drive train assembly 4 is portable and can easily be detached and moved from one set of handlebars 2 of a bicycle or stationary trainer to another. In these applications, MPC drive train assembly 4 may be coupled to the exercise apparatus through the use of attachment assembly bracket 7. This bracket 7 may include a handlebar orifice 16 and handlebar clasps 7a the operate together to couple to handlebars 2 or forearm bars 3. The drive assembly 4 may also include a lower bracket attachment strap 8 that may operate to attach the assembly bracket 7 to the front the frame 1, such as, but not limited to, the head tube 1b. The MPC drive train assembly 4 may also include attachment bracket 11 for operatively coupling the moveable resistance rod 5 to a yoke 17 of the forearm bars 3, thereby allowing an exerciser to operate the forearm bars 3 with the elbow rests 13 about the forearm bar fulcrum 15 to operate the drive train device 4. The moveable resistance rod 5 is moved into and out of the adjustable pressure mechanism 6. On the embodiment shown in FIGS. 1-6, the adjustable pressure mechanism 6 include wheels and may include a resistance pressure regulating knob and rod 14 that operates in conjunction with the axle 18 holding the adjustable pressure mechanism 6 that includes an adjustment wheel to adjust the resistance provided by the adjustable pressure mechanism 6. The rotation of the knob and rod 14 in one direction increases the resistance and the rotation in the other directions decreases the resistance. For embodiments where the resistance is permanent magnets, the rotation of the control knob 14 rotated in one direction moves the permanent magnets closer to the moveable resistance rod 5 to increase resistance or rotated in an opposite direction moves the permanent magnets away from the moveable resistance rod 5 to decrease resistance. For embodiments with an electro-magnet, rotation of the control knob 14 in one direction increases the current through the electro-magnet to increase the resistance and rotation in the opposite direction decreases the current through the electro-magnet to decrease the resistance. While it has been discussed that the resistance is adjusted using a pressure control knob 14, it should be understood that the MPC drive train assembly may include a pressure control device that is may be an electric pressure control device wherein depressing buttons adjusts the resistance. In some embodiments, the resistance control is a pressure control knob wherein rotation of the pressure control knob in one direction increases resistance of the adjustable pressure mechanism and rotation of the pressure control knob in the opposite direction decreases resistance of the adjustable pressure mechanism. In some embodiments, the resistance control device is a combination of the electric pressure control device and the pressure control knob selector.

In other applications this invention also becomes the resistance making component part in such other application. Examples of the various applications are a) road riding bicycles, b) stationary cycling trainers, c) arms and legs powered stationary training cycles, d) rowing machines, and e) combinations of these applications. This invention can work dependently or independently of energy being created by exercisers energizing their leg and hip muscles.

In addition to exercising one's upper body muscle groups, it can also cause more nitric oxide to be delivered to the blood stream and red blood cells from relevant reoxygenation signals emitted by tissues, such as muscle tissue, and nitric oxide being secreted from blood vessel lining epithelial cells. The development of this additional nitric oxide resting on hemoglobin proteins allow for more "useable oxygen" and blood nutrients to diffuse into tissue adjacent to the relevant blood vessels adjacent to the signaling cells. This additional secretion of nitric oxide occurs as a result of conducting full-body exercising using both the arm plus leg muscle groups compared to just legs-only muscle groups.

The instant "push and pull" or "up-down" resistance-making device can be used to exercise the arms, shoulders, and upper back while pedaling an upright stationary trainer or bike, or it can also be used on a recumbent cycling trainer to exercise the user's upper body. In the upright cycling trainer application, riders "up-down" movement of their arms on their forearm bars can move the Moveable Resistance Rod up and down along the circumference of an arc. This in turn will move the Moveable Resistance rod/bar up and down through an arc within the Adjust-able Pressure Mechanism containing, but not limited to, adjustable wheels, permanent magnets, or electro-magnet.

When the rider is exercising on a recumbent stationary trainer, exercisers can move their handlebars "back and forth" horizontally and operatively through the Adjustable Pressure Mechanism. Examples of such a resistance device can include, but are not limited to pressure adjustable wheels, a permanent magnet, or electromagnet, or any other such Adjustable Pressure Mechanism. In both these upper body exercise applications, riders have the choice of performing their upper body exercise activity or not. And if they choose to perform their upper body exercise activity at the same time as cycling on the pedals with their legs, they can choose to modulate the number of watts of energy at completely different rates of energy from each set of muscle groups involved in their full-body exercise activity. Thus, the use of full-body exercising is ON DEMAND, the choice is always up to the rider as to how much, if any, energy to exert from the upper body and lower body muscle groups. For example, if riders are exercising both their arms and legs, but their arms get tired, they just modulate energy levels from their arms to having more energy from their leg muscle groups, which are not yet tired. Then, when their legs get tired, they reduce energy from their legs and increase it in their arms. In doing so, exercisers have the opportunity of performing the most efficient exercise experience possible.

Converting a Legs Only Cycling Trainer into a Full-Body Cycling Trainer Using an After-Market Version of this Invention The "Push-Pull" MPC Drive Train Assembly 29, 29a, can be used with a stationary recumbent cycling trainer that otherwise operates as a legs-only trainer. (See FIGS. 8 and 13 To accomplish this, the rider simply takes the Attachment Bar 24 and slides it over one of the two hand grips 31c positioned in the front corners of the two bottom sides of the seat 31. Attachment Bar 20 is then fastened onto the seat's hand grip 31c, the "Push-Pull" MPC Drive Train Assembly 29, 29a, is mounted onto this Attachment bar 20 and is ready to provide the exerciser with a full-body work-out. (See FIG. 13)

Applying this Invention as Original Equipment to a Legs-Only Stationary Trainer

The "Push-Pull" MPC Drive Train Assembly 29, 29a can also be mounted on a stationary recumbent cycling trainer by attaching it onto the side of the console 19, the display's vertical support bar, or an independent vertical rod. (See FIG. 8) Then the movable resistance rod 5 is pushed and pulled, back and forth by the exercisers. The movable resistance rod 5 is attached operatively to the console 19 with, for example linear bearings 32, and on the back end closest to the rider, is a perpendicular attached handlebar 23 with hand grips on each end. (See FIGS. 8,9, and 11.)

The reason people turn their legs-only aerobic training cycles into full-body ones 19 is that the full-body trainers are far more efficient at improving exerciser's levels of VO2Max, Lactate Threshold, and other positive health related reasons. Our independent tests, conducted in two different fitness centers with a total of 12 exercisers, showed that after 12 days of aerobic training, conducted every other day during one month, full-body exercisers achieved, on average, 95% greater incremental VO2 Max scores, and 165% greater incremental Lactate Threshold levels, compared to the legs-only exercisers. Thus full-body aerobic exercising takes less time to achieve a person's desired physical fitness level compared to legs-only aerobic training. It can also take them to higher fitness levels. This is why exercisers prefer to perform full body exercising when using upright bicycles 1, with rear wheel and upper body resistance trainers, 1, 4, 7, recumbent stationary cycles, 19, 24, 29, and combined rowers with recumbent cycling trainers. 19, 24, 29a, 23.

Applying this Invention as an After-Market Product for Bicycles

Figure 2:
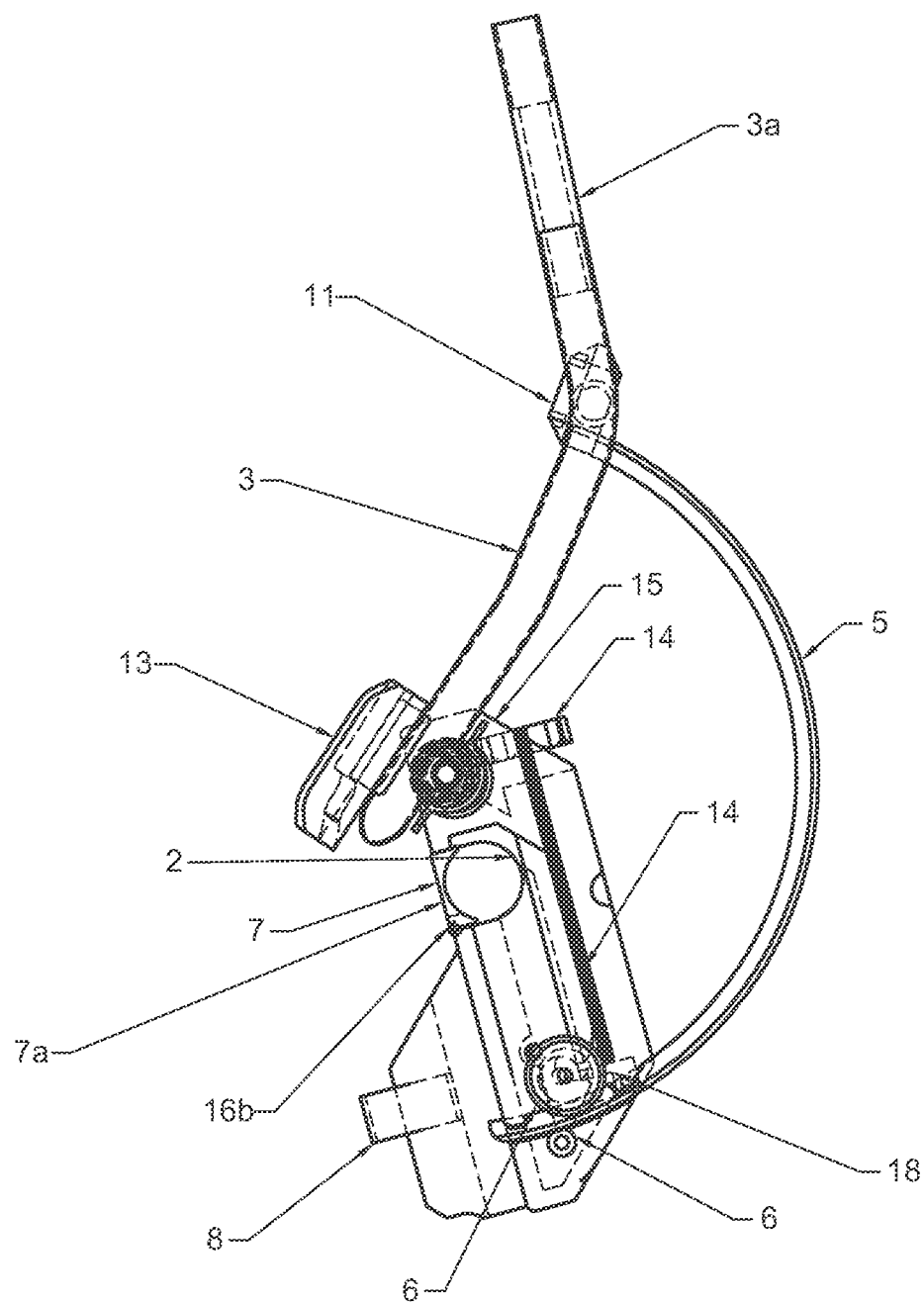
FIG. 2 is a side view of the Handlebar Attached Resistance Device affixed to the bicycle handlebars and also showing how many of the internal parts of the "up-down" movement of the forearm bars cause the Moveable Resistance rod/bar to travel through the Adjusting Pressure Mechanism.
Figure 3:
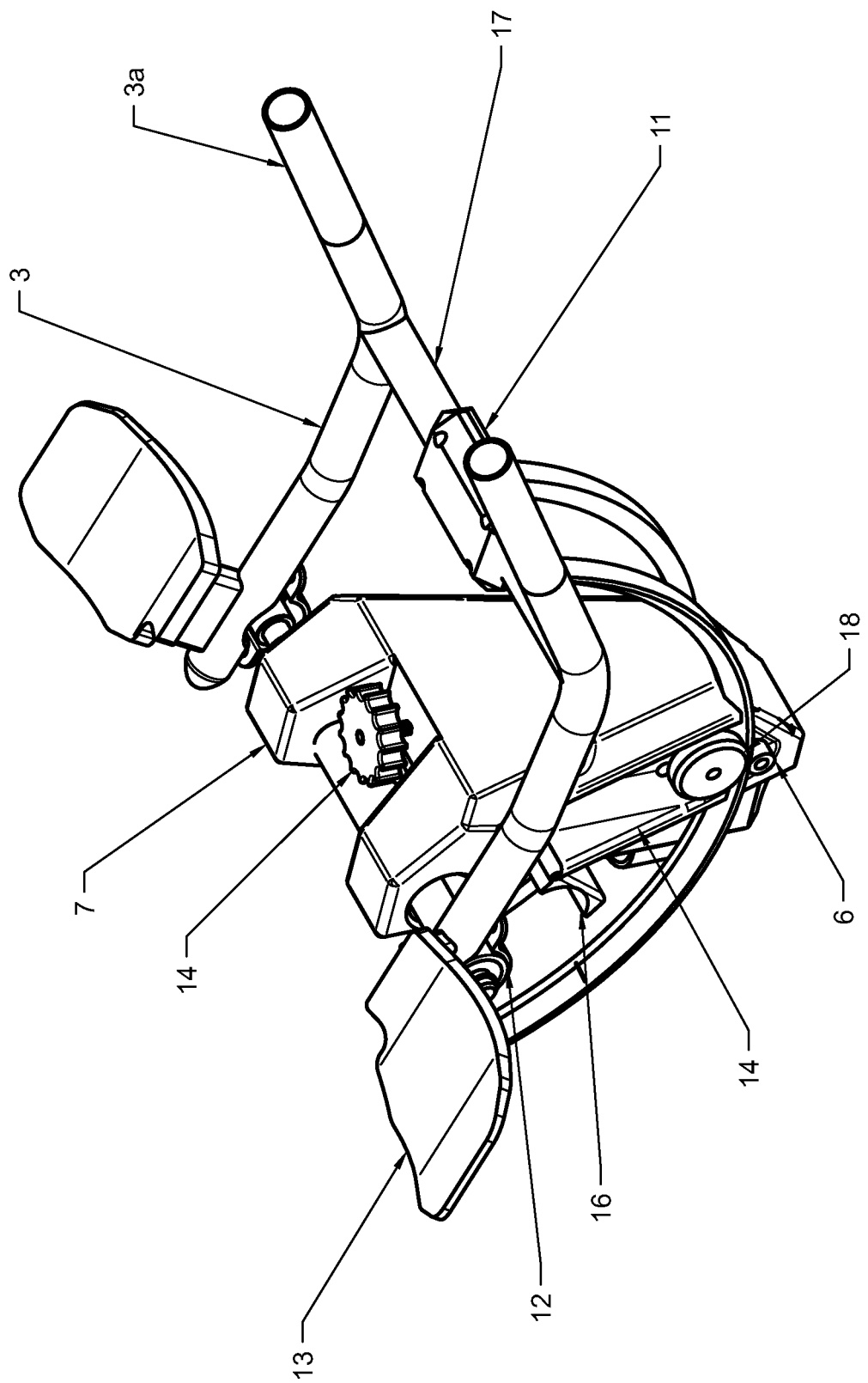
FIG. 3 is an oblique side frontal view of the Handlebar Attached Resistance Device not attached to the handlebars and is shown with the forearm bars in the up position. It also shows the Bracket that houses the "up-down" and "back and forth" Resistance MPC Drive Train Assembly. This Bracket attaches the Assembly to the Handlebars and holds the Assembly in place during upper body exercise.
Figure 4:
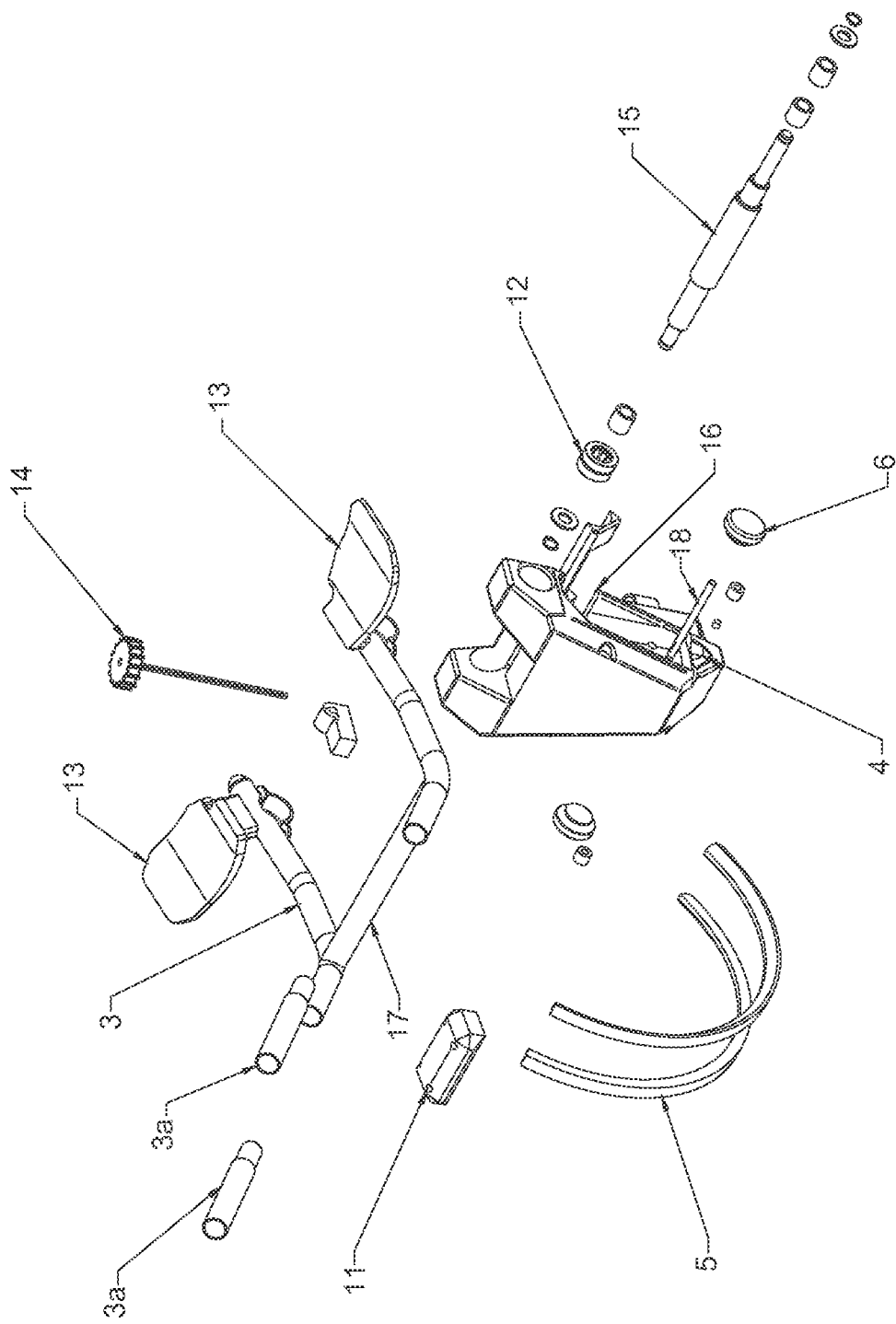
FIG. 4 is an exploded view of the Bracket and many of the parts used inside the "Up-Down" MPC Drive Train Assembly, and which is portable, and can be attached to the front Handlebars of most any bicycle.
Figure 5:
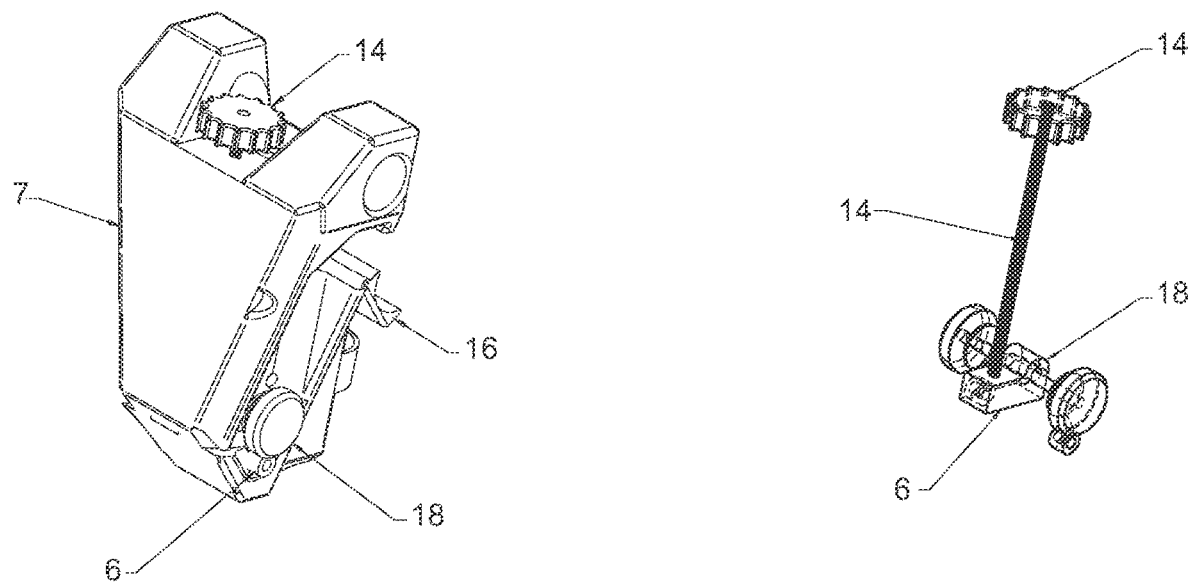
FIG. 5 is an isometric view of the Handlebar Attached Resistance Device and is shown from an elevated and rearward position looking forward toward the front of the Handlebar Attached Resistance Device and bike.
Figure 6:
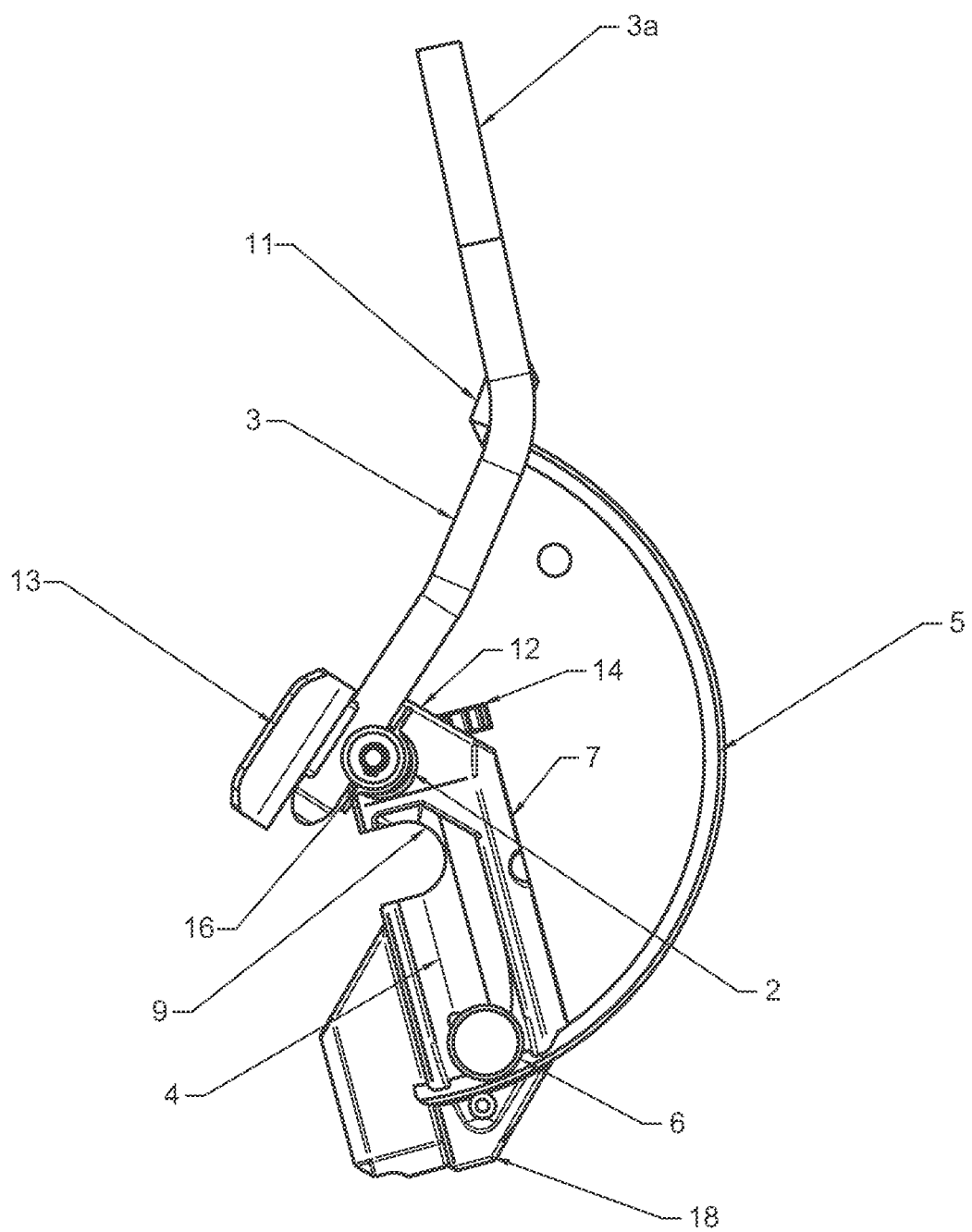
FIG. 6 illustrates 2 separate drawings showing a side view of the "Up-Down" MPC Drive Train Assembly.

To operate the "Up-Down" MPC Drive Train Assembly 4, and its Housing and Attachment Bracket 7, on an upright bicycle 1 the following steps occur:" (See FIG. 1,2)

The rider operatively installs the "Up-Down" MPC Drive Train Assembly 4, 7, onto the bicycle's handle bars 2. This can be accomplished by opening the horizontal attachment clasp 7a, move the Assembly Bracket 7 onto the bicycle handle bars 2, close the handlebar clasp 7b, and operatively lock the clasp 7b into place over the Handlebars 2. A non-limiting example for locking the clasp 7b onto the Handlebars 2 is to screw two screws into holes on the clasp 7b and into receptacles on Assembly Bracket 7; (See FIG. 6)

The exerciser then takes the attachment holding mechanism (can be a rubber strap) 8 on the lower rear section of the Assembly Bracket 7, and attaches it to the cycle 1 frame by, for a non-limiting example wrapping it around the head tube 1b, and fastening it back onto the lower rear section of the Assembly Bracket 7;

Riders then mount their elbows onto the forearm bars 3, clasp their hands onto the forearm bar hand grips 3, and start to move their hands up and down while keeping their elbows positioned directly on top of the elbow holders 3. (See FIGS. 1,2,3, and 4)

If riders wish to simultaneously exercise their lower body, then they rotate the pedals 28a contemporaneously with the up and down movement of their forearms 3;

Exercisers then adjust the amount of resistance they wish to experience by both their arms and legs to their desired levels. They do this by turning the resistance adjustment knob 114, located on the front top of the "Up-Down" Assembly Housing Bracket 4, 7, as well as the resistance adjustor for the rear wheel positioned in the rear wheel trainer; (See FIGS. 3, 4, and 5)

When the rider turns the resistance adjustment knob 14, this causes its attached rod 14 to simultaneously rotate to the desired location, which in-turn causes the Adjustable Pressure Mechanism 6 to operatively create more or less resistance for upper body exercising by riders. Non-limiting examples of this resistance modification are by moving the pressure-creating wheels or permanent magnets in-or-out relative to the sliding Movable Resistance Rod 5. (See FIGS. 2, 3, and 4)

The amount of resistance is operatively controlled by creating more or less resistance to push or pull the Movable Resistance Rod 5 through the Adjustable Pressure Mechanism 6. For example, the desired resistance can be created by: a) moving closer together, or further apart, the 2 wheels through which the Movable Resistance Rod travels, b) moving closer together or further apart 2 permanent magnets through which the Movable Resistance Rod travels, or c) increasing or decreasing the electric current flowing through the electro-magnetic coil, located within the Adjustable Pressure Mechanism 6. (See FIG. 2)

The amount of resistance being utilized by the upper body and its forearms, shoulders, and hands of the exerciser can be operatively measured at any moment during the exercise activity. Some of the non-limiting means for measurement include strain gauges placed in an appropriate location (such as the handle grips on the forearm bars) 3, 3a of this invention or measuring the electrical current necessary to create the desired amount of resistance on pushing and pulling the forearm bars 3. (See FIGS. 1, 2, 3, and 4)

During the exercise activity, if riders decide they wish to not exercise their forearms and upper bodies, they just quit moving their arms, but can continue to rotate the pedals 25 and cranks with their legs. This is because both exercising motions are separate one from the other. This feature for exercising individual muscle groups individually or all together is called ON DEMAND.

When riders have completed their exercise activity, they simply release their hands from the forearm bar hand grips 3a, remove their forearms from the forearm bars 3, and dismount themselves from the resistance exercising device 1. (See FIGS. 1, 2, 3, and 4)

Exercising with Invention Mounted on a Recumbent Stationary Cycling Trainer

To operate a stationary recumbent cycling trainer 19 that already has a "Push-Pull" MPC Drive Train Assembly 4 and Housing 24 installed on it, the following steps occur: (See FIG. 8)

1) Exercisers mount the recumbent seat 31, then take the Handlebars 23 into their hands. These handlebars 23 rest horizontally and are attached perpendicularly to the Moveable Resistance Rod 5 in its horizontal plane 5; (See FIGS. 8, 9, and 13)
2) Exercisers then use their arms and hands to push and pull the horizontal Moveable Resistance Rod 5 back and forth through the rear section of the Assembly Bracket 22, and its Assembly 29; (See FIG. 8)
3) This back-and-forth movement of the Handlebars 23, which are attached to Moveable Resistance Rod 5, moves it 5 through the Adjustable Pressure Mechanism 6, in the same manner the invention does when attached to the handlebars 2 of a road bike 1 and its "Up-Down" MPC Drive Train Assembly 4; (See FIGS. 1, 2, 3, 4, and 5)

If riders wish to simultaneously exercise their lower body, then they rotate the pedals 25 contemporaneously with the back-and-forth movement of their forearms and Handlebar 23. Resistance is operatively controlled and created for the pedals 25 with a resistance mechanism similar to that used in a common rear-wheel trainer by Wahoo Kick® or Omnium Over Drive;

Riders control the resistance to the Moveable Resistance Rod 5 through turning the Resistance Control Knob 14, which increases or loosens the pressure being created on the Moveable Resistance Rod 5 by the Adjustable Pressure Mechanism 6;

The Adjustable Pressure Mechanism 6 that operatively controls the resistance against the Moveable Resistance Rod 5 can be of many designs, but in a non-limiting way, it can use pressurized wheels, permanent magnets, an electro-magnet, or a resistance motor. The Pressure Control Knob 14 is attached to and rotates the Pressure Control Rod 14, which then adjusts the desired pressure being placed on the Moveable Resistance Rod 5 by the Adjustable Pressure Mechanism 6.

This increase or decrease in the desired pressure placed on the Moveable Resistance Rod 5 is accomplished by moving-in-or-out the Resistance Creating Wheels or Permanent Magnets, located in the Adjustable Pressure Mechanism 6, and through which the Moveable Resistance Rod 5 is pushed and pulled by the hands and arms of the exerciser; When an electro-magnet is used for creating resistance, the portion of the Moveable Resistance Rod 5 that moves through the electromagnet must be made of a material that conducts an electric current, such as, but not limited to aluminum or copper.

Exercisers then adjust the amount of resistance they wish to experience by both their arms and legs to their desired levels. To adjust the pressure and resistance against their legs, this can be accomplished by separately adjusting the resistance placed against the flywheel;

The amount of resistance is operatively controlled by creating more or less resistance on the push or pull function of the Movable Resistance Rod 5 through the Adjustable Pressure Mechanism 6. For example, the desired resistance can be created by: a) moving closer together, or further apart, the 2 wheels through which the Movable Resistance Rod travels, b) moving closer together or further apart 2 permanent magnets through which the Movable Resistance Rod travels, or c) increasing or decreasing the electric current flowing through the electro-magnetic coil. (See FIG. 9)

The amount of resistance being utilized by the upper body and its forearms, shoulders, and hands of the exerciser are operatively measured at any moment during the exercise activity. Some of the means for measurement include strain gauges placed in appropriate locations (such as on the Hand Grips or Handlebar) on this invention or measuring the electrical current necessary to create the desired amount of resistance on pushing and pulling the forearm bars. (See FIG. 11)

During the exercise activity, if riders decide they wish to not exercise their forearms and upper bodies, they just quit moving their arms, and the Handlebars 23 and Moveable Resistance Rod 5 will quit moving in or out. However, exercisers can continue to rotate the pedals 25, 28 and cranks with their legs. This is because both exercising motions from their arms and legs are separate one from the other. This feature for exercising muscle groups individually or all together is called ON DEMAND.

When riders have completed their exercise activity, they simply release their hands from the Handlebar Hand Grips 23, remove their feet from the Pedals 25, 28 and dismount themselves from the Multi-Power Stationary Cycling Trainer. (See FIG. 8)

Rower

Figure 7:
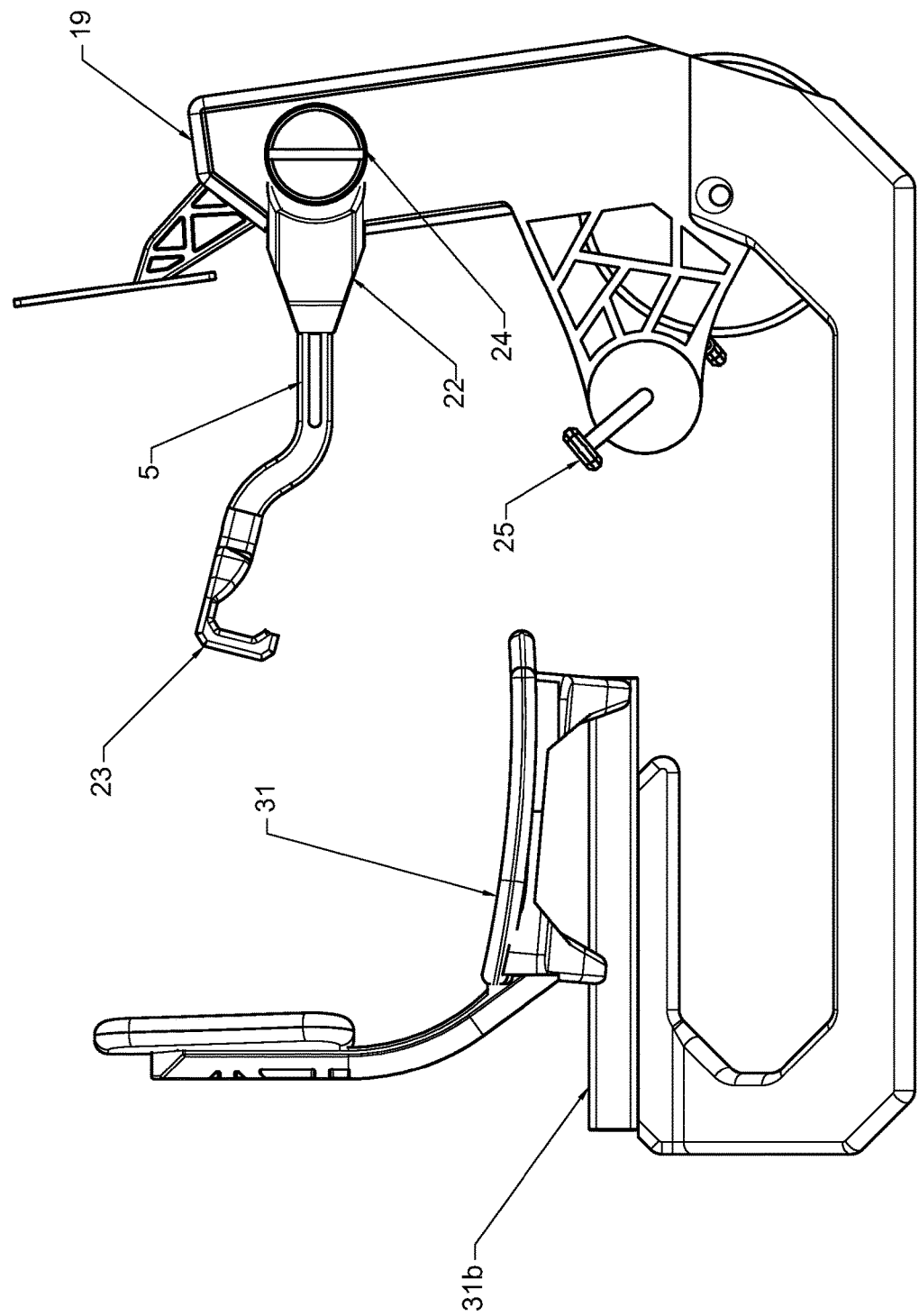
FIG. 7 is a side view of a Multi-Power stationary recumbent trainer with a Handlebar Attachment Device already installed on it.
Figure 8:
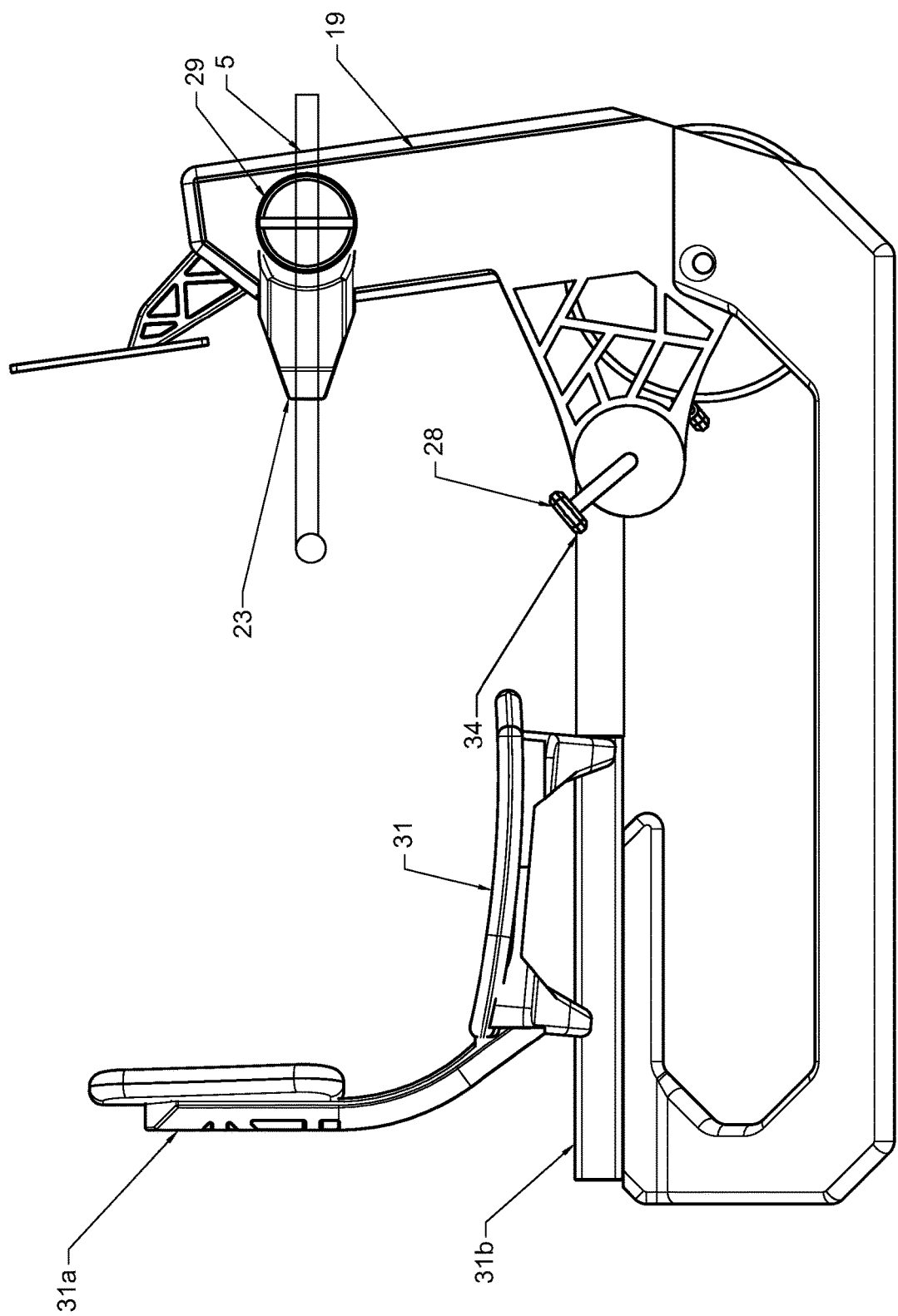
FIG. 8 is a side view of a Combined Multi-Power Stationary Recumbent trainer and Rower, including many of its Component Parts.
Figure 8A:
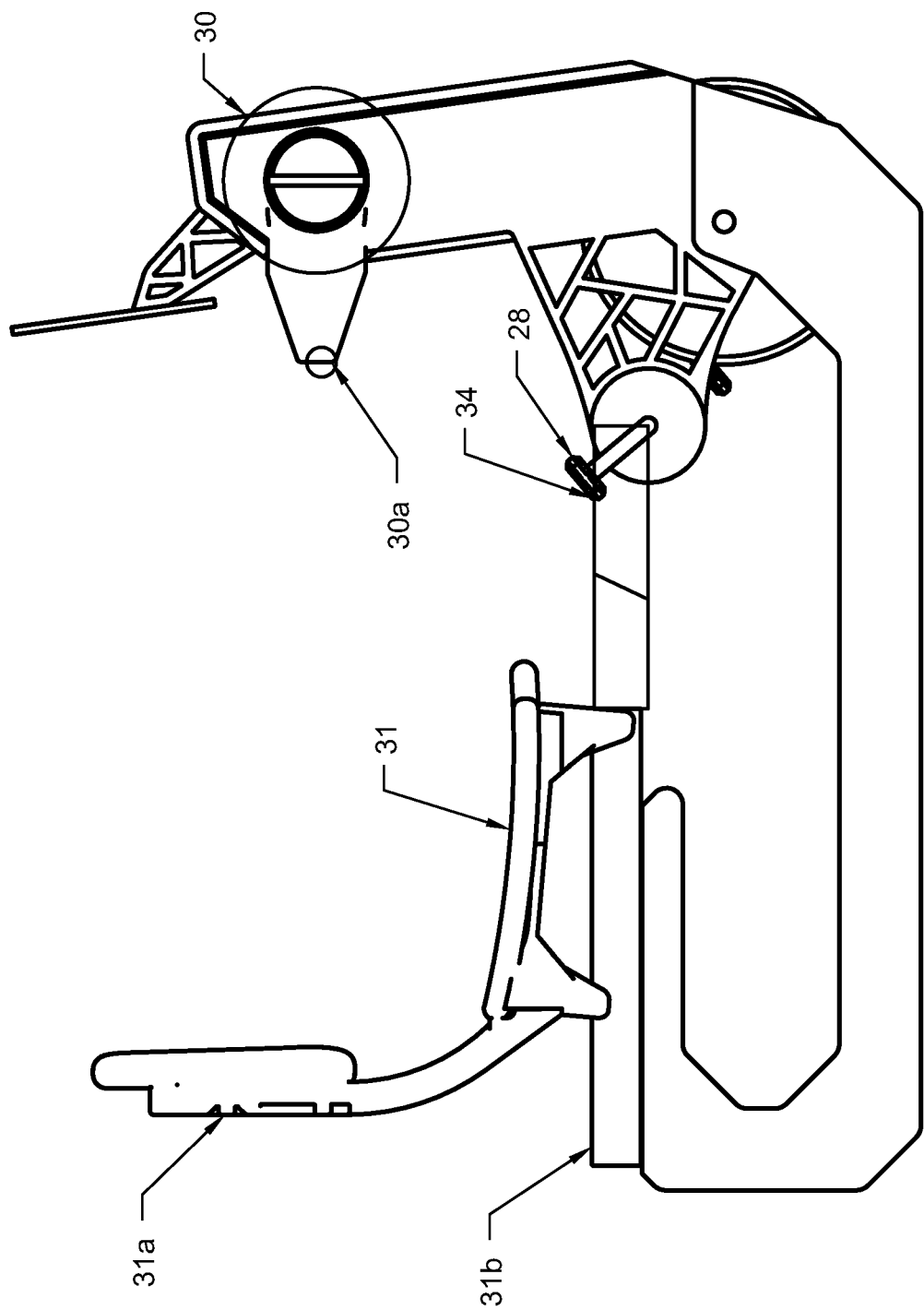
FIG. 8a is a side view of a recumbent stationary cycle modified to become a combined stationary cycle and rower. It has a standard rotary rowing resistance device mounted on it.
Figure 9:
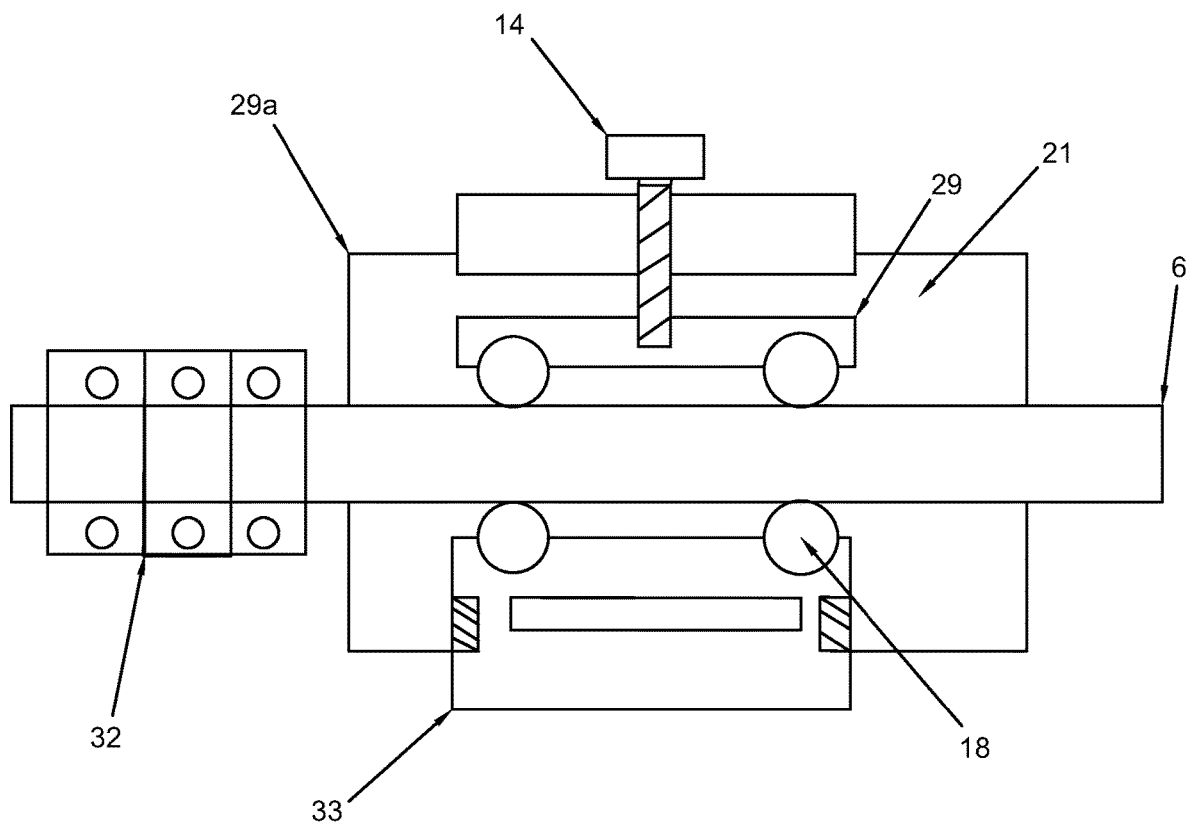
FIG. 9 is a side view of the "Push-Pull" MPC Drive Train Assembly, its Housing, and Linear Bearings Set.
Figure 10:
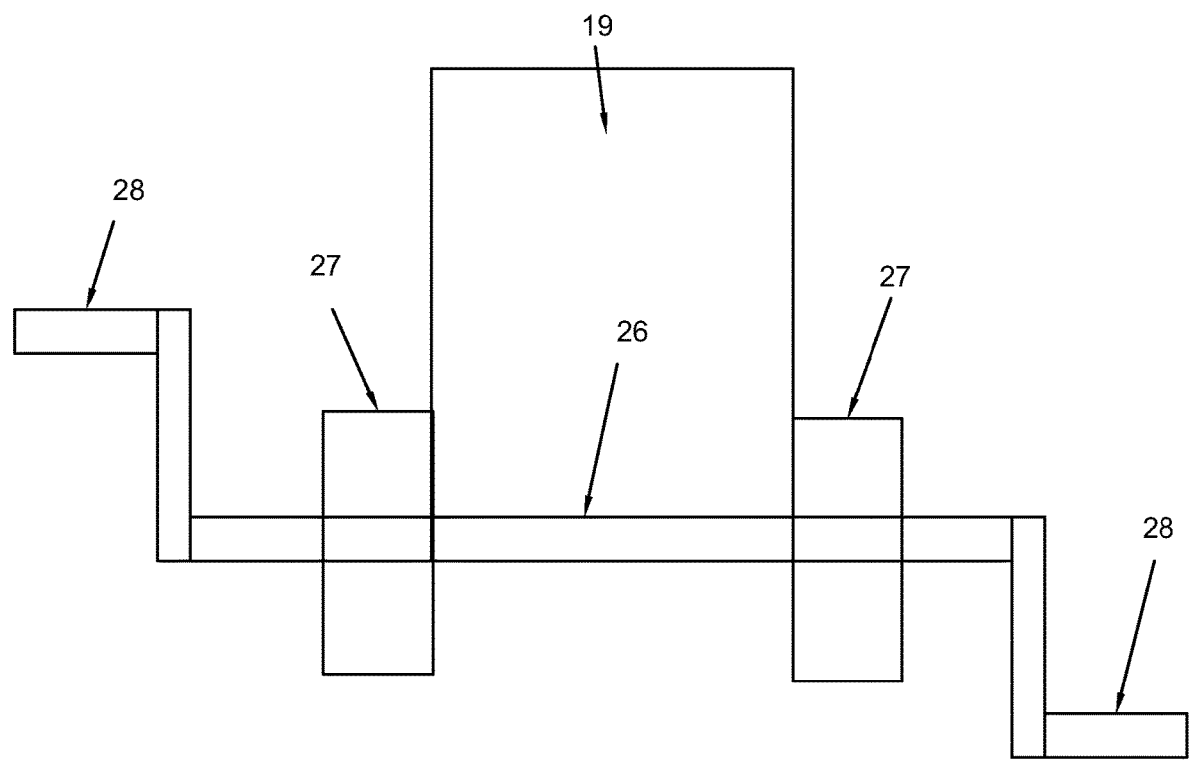
FIG. 10 is a side view from the front of the Extended Crank Shaft, Footrests for the Rowing Function, and mounted adjacent to the console or Housing for the Extended Length Crank Axle, plus Cycling Pedals mounted Outboard of the Footrests.
Figure 11:
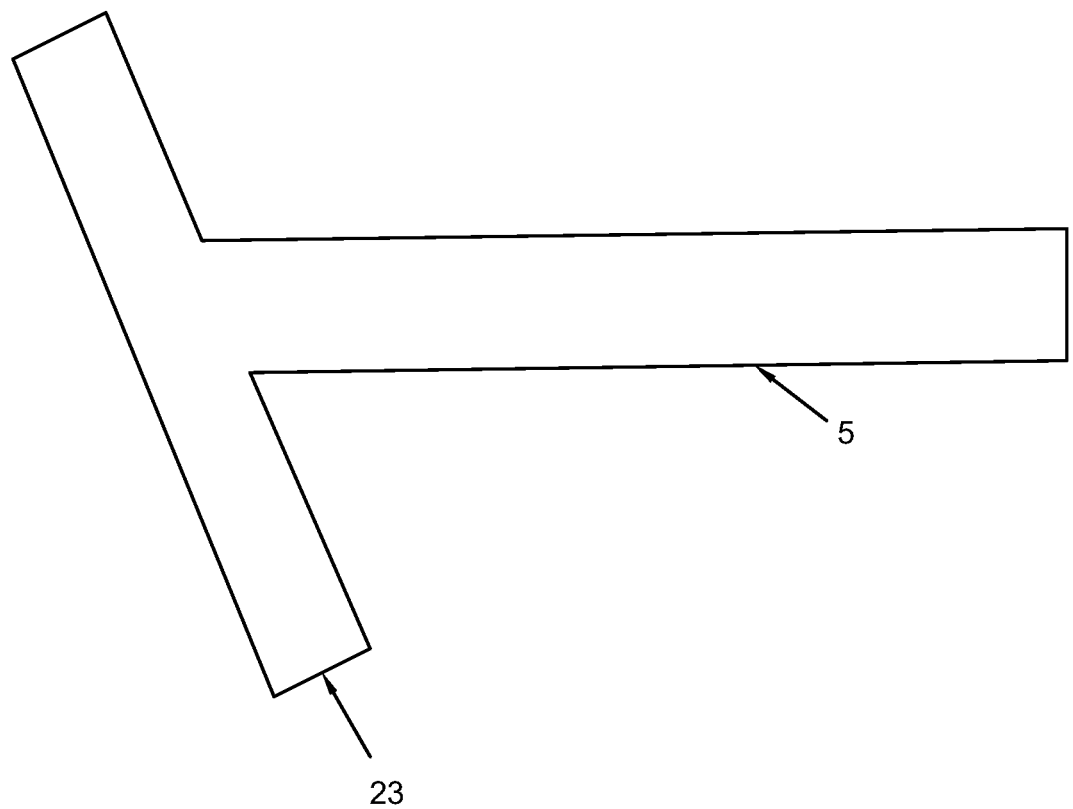
FIG. 11 is an oblique side/rear view of the Moveable Resistance Rod Attached Perpendicularly to the Handlebars used to exercise the upper body, arms, hands, and shoulders during the Push-Pull function on the MPC Full-Body stationary Cycling Trainer and Rowing Machine.
Figure 12:
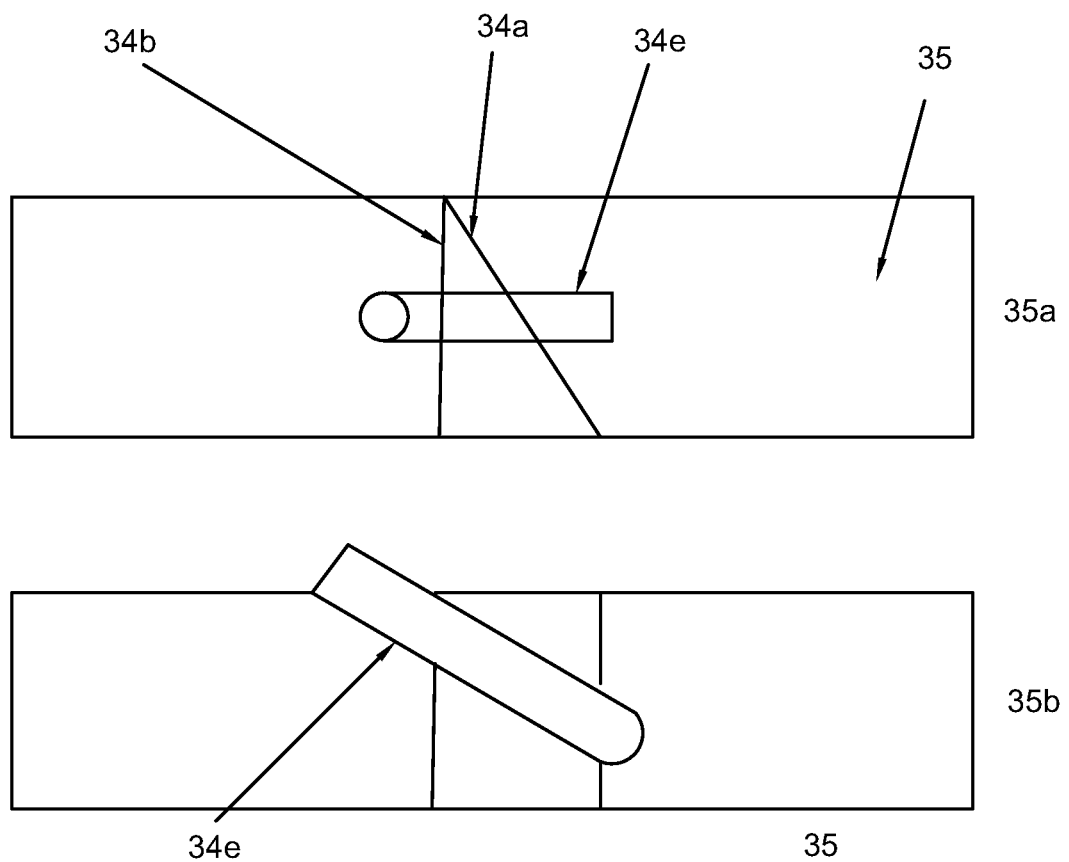
FIG. 12 is a side and top view of the front connection mechanism for the Swinging Horizontal Bar Support which closes to form a complete elongated roller bar upon which the sliding seat can roll during a rowing exercise activity.
Figure 13:
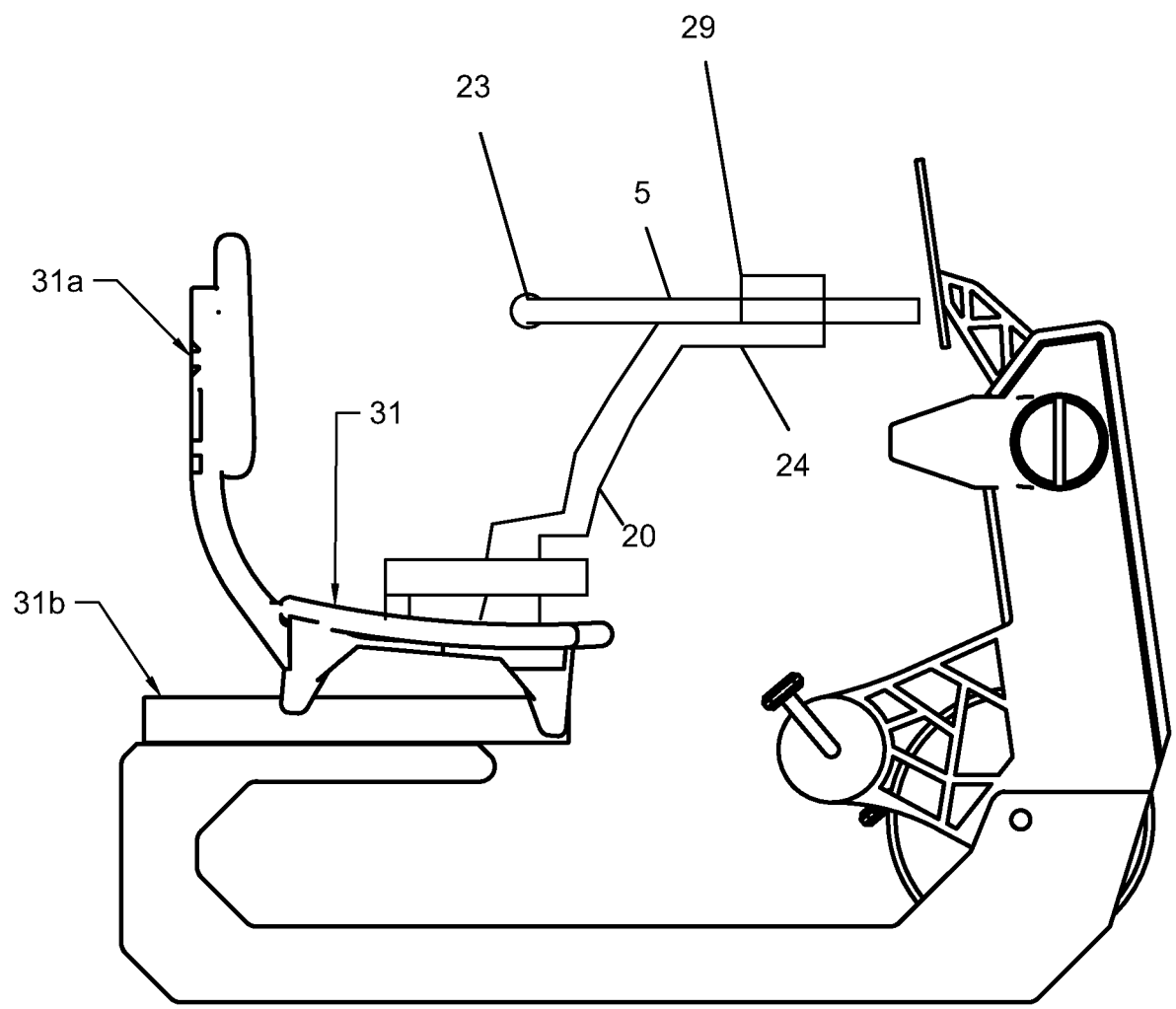
FIG. 13 is a side view of the Multi-Power-Cycling Attachment Bar mounted over one of the 2 Sliding Seat Hand Holders.

The Recumbent "Push-Pull" MPC Drive Train Assembly 29 and its Housing and Bracket 24, shown in FIG. 7 can also be used as a Full-Body Combined Stationary MPC cycling Trainer and Rowing Machine 19, as shown in FIGS. 8, 8*a*, and 13. To accomplish this, the following changes in the Recumbent "Push-Pull" MPC Drive Train Assembly 29 and Housing 24 mounted on a Stationary MPC Cycling Trainer need to be made: (See FIG. 8)

The Moveable Resistance Bar 5 needs to be extended to a length that will accommodate the full-length travel of rowing exercisers completing all 6 positions of a rowing stroke. These steps are a) Catch, b) Leg Drive, c) Finish, d) Hands Away, e) Body Over, and f) Recovery.

This means that in addition to accommodating the length of the hands and arms moving from the fully extended position in Recovery to the fully pulled against the chest position during the Finish, there also needs to be added a length equivalent to this fully extended legs position. This includes the distance of the legs moving from the folded-up position in Recovery to the fully open and extended position finishing the Leg Drive;

Alternatively, a circular standard rowing machine resistance/rope device 30 can just be attached to the console 19 or vertical bracket mounted near the front of this combined rowing machine, recumbent stationary legs-only cycle, and recumbent stationary Multi-Power cycling trainer. (See FIG. 8) The resistance in the standard circular re-winding rope holder 30 is usually created from water, air, hydraulics, or magnetics;

The Swinging Horizontal Bar Support 34 needs to be moved from its open position to the closed position. To do this the rower rotates the Swinging Horizontal Bar Support 34, stored under the seat 31, to the closed position with its front end 34*a* attached to its vertical front support bracket 35. (See FIGS. 8, 12 and 14)

Once moved into the "closed" position, the rower inserts the "locking plug" into the holes that pierce through the front end of the Swinging Horizontal Bar Support 34*a* and the rear end of the vertical support bracket 35. (See FIG. 12)

The rower then takes the horizontal support part 34*d* and inserts it into the cut-out in the side of the Stationary Seat Support Bar 31*b* and Swinging Horizontal Support Bar 34. (See FIG. 14). The rower then closes the rotating cover over it 34*d* to locks it 34*d* into position for a rowing exercise. (See FIGS. 8, 9 and 14)

The crank axle 26 also needs to be extended. It 26 needs to be extended to allow footrests 27 to be installed between the console 19 or console's vertical supports and its rotating foot pedals 28.

In addition to extending the length of the crank axle 26, these footrests 27 need to be added for the purpose of holding in place the rower's feet during all 6 steps of using good technique while exercising a "stroke".

The footrests 27 can be positioned in many different locations including, but not limited to: a) over and covering the extended crank axle 26 with bearings separating the footrests 27 from the extended rotating crank axle 26 during a cycling exercise, b) over the extended crank axle 26, but not touching the extended rotating crank axle 26 during a cycling exercise, c) any location not within the volume of space defined by the circumferential area of the rotating pedals 28 multiplied by the distance of the increased length of the extended crank axle 26 from its attachment point to the console 19 or console's vertical support rod, or any other useful position not within the circumferential area defined by the preceding clause.

The purpose for generally defining the location of the footrests 27 is to ensure that the exerciser can utilize the pedals 25 without interference from the footrests 27. For example, if footrests 27 were to be mounted on the extended crank axle 26, but outboard of the rotating pedals 25, but within the circumferential plane of the rotating pedals, the legs of the rower would come into contact with and hit the crank axle during its 360-degree circular rotation of each pedal in its circumferential plane. Accordingly, the location of the footrests must be such that it does not interfere with the operation of the pedals when the exerciser is in the action of pedaling.

Clips 27a or foot baskets 27b can also be used to hold the feet in position onto the footrests 27 during all 6 steps of performing a stroke using good technique;

For example, clips 27a, or baskets 27b, can be used as a "foot holder" by rowers when they push themselves backward during the Catch, Leg Drive, and Finish steps;

They can also be useful to hold the rowers' feet in place as rowers pull themselves forward during the Hands Away, Body Forward, and Recovery steps;

So that footrest 27 remain stationary on the bearing or bushing while the extended crank axle may be rotating during a cycling exercise, the footrests 27 may be held in a stationary position by being attached to a bracket that is mounted on the housing which holds the extended crank axle 26, or a bracket mounted upon another conveniently located solid stationary component;

3) The open walk-through space between the seat 31 and the handlebars 23 also needs to have a swinging Horizontal Moveable "Sliding-Seat" Bar Support 34 placed into this space so that the seat 31 can be safely and smoothly moved on rollers backward and forward during all 6 steps of a rower's rowing stroke using good technique;

a) One of several non-limiting ways to position such a Horizontal "Moveable 'Sliding-Seat' Bar Support" 34 is to have this bar 34 attached to a Hinge 34c at its rear end. This hinge 34c would also be attached to the already existing Horizontal Stationary Seat Support Bar 31b.

b) The method of attachment could be such as using a hinge 34c, that would allow the "moveable 'sliding-seat' bar support" 34 to swing into a position under the adjustable sliding seat 31 when this exercise device is not being used for a rowing exercise. It 34 would then be safely and conveniently tucked out of the way;

c) When exercisers wish to enjoy a rowing exercise activity, they simply unlatch the "moveable 'sliding seat' bar support" 34 from its resting location under the seat 31, and using the hinge 34c, rotate it 34 into the closed position so that there is now one continuous bar 34, 31c upon which the sliding seat 31 can be moved back and forth over this continuous and connected sliding seat support bar 34,31c during all 6 stroke steps; (See FIG. 9)

d) There are many ways to latch the front end of the "Moveable 'Sliding Seat' Bar Support" 34 onto the console 19 or other forward positioned front support holder 35. Such latching mechanism 34a needs to take into account that the front end of the "Moveable 'Sliding Seat' Bar Support" 34a rotates into its closed position by swinging closed through an arc. Thus, both the front end of the "Moveable 'Sliding Seat' Bar Support" 34a and its matching Vertical Support Latching Device 35a can be cut circumferentially to match this 'swinging closed' arc geometry. This will permit the 2 ends to fit together snuggly and precisely;

e) The weight of the rowing exerciser also needs to be taken into account and supported by the front vertical support holder 35b for the "Moveable 'Sliding-Seat' Bar Support" 34. This can be accomplished by having the two latched ends, 34b, 35b of the swinging "moving 'sliding-seat' bar support" 34b and its front vertical support structure 35b, cut in a manner such that the rotating "moving 'sliding-seat' bar support 34 rests on top of the diagonally-cut front vertical support rod or structure 35b.

f) This means that the interface connection between the "moving 'sliding-seat' bar support" 34a, 34b and its front vertical support rod, structure, or bracket 35a, 35b would be cut in a 2-plane manner. This latching mechanism will accommodate the angle of circumferential rotating arc of the swinging "'sliding-seat' bar support" 34 plus the diagonal cut of this interface 34a, 34b, 35a, 35b such that the front end 34a, 34b of the "moving 'sliding-seat' support bar will be on top of and supported vertically by the rear end of the console's vertical support rod, structure or bracket 35a, 35b. It will be understood that this is one way in which to accomplish the support of the sliding seat, but other embodiments may be utilized that do not depart from the intent of the invention and scope of the claims.

g) The rear end of the swinging "Moveable 'Sliding-Seat' Bar Support" 34, 34c matches-up with the front end of the Stationary Sliding Seat Support 31c. These 2 ends are joined together with a hinge attached to both parts 31c, 34c.

h) By placing a Top Plate 36 over both the Stationary Sliding Seat Support bar 31c and the Swinging Sliding Seat Support 34 and cutting this top plate 36 on its forward end into a diagonal shape, this will assist the sliding roller seat to be able to transition smoothly from the "Swinging 'sliding-seat' bar support 34, 34c onto the stationary sliding seat support 31c during a rowing stroke. (See FIG. 14)

4) In some situations, it may be the case that exercisers do not have the room nor space to permit the Moveable Resistance Rod 5 to slide the entire horizontal distance required during a complete 6 step rowing stroke.

a) Thus, the Combined Stationary Cycling Trainer and Rower is flexible enough to allow for the installation and use of a standard circular resistance-creating device, such as those that are used on rowing machines that are dedicated exclusively to rowing. Examples are those made by Concept and Nordic Trac 30. (See FIG. 8a)

b) Without limitation, these rowing resistance devices 30 can use any of the following types of mediums to create their resistance: a) hydraulic, b) water, c) air, or d) magnetic. The exerciser can pull a rope, cord, or solid hand-held object that is operatively connected to the resistance creating component, 30 in order to perform the 6-step stroke used in a rowing exercise.

c) While the rowing resistance-creating device 30 can be installed in many different locations, some locations would include, but not be limited to: a) attachment to the console, 19 b) attaching it onto the vertical rod or bar that supports the display, or c) attach it to a separate rod or bar that is also attached to the frame.

5) In order for a rower exerciser to be able to achieve good technique through all 6 positions of a complete stroke, it will be necessary for the rower to be able to "Finish" with his or her back bent somewhat beyond 90 degrees to the plane of the seat slider bar 31b. To accomplish this, the back of the seat 31b needs to be able to be removed or tilted. (See FIG. 8)

a) While there are many designs that would allow a person to pull-out the seat-back 31a, the seat back 31a could be installed such that it 31a is held in a relatively perpendicular position to the seat bed 31 by having 2 or more pipes, bars or rods, that form the sides of the seat back 31a, and they are placed into geometrically matching holes in the rear sides of the seat frame 31;

b) Another means for allowing the seat back 31a to tilt and allow a rower to complete all 6 steps of the rowing Stroke with good technique is to have self-locking hinges that permit the rower to adjust the seat back 31a so that it 31a is out of their way during the Finish step in a complete 6 step Stroke.

One of the major benefits of having a combined cycling plus rowing exercise device is that by using one single exercise machine, (See FIG. 8) people can enjoy both aerobic and anaerobic exercise activities from using just one exercise machine and not 2 or 3 machines.

Another major benefit is that from an occupied space viewpoint, people do not need to use up the extra space in their home required for the footprint of 3 separate exercise devices including, but not limited to: a) Legs-only stationary cycle trainer, b) Arms-only ergometer, and c) rowing machine. Instead, in the total space limited to just one Combined MPC Stationary Full-Body Cycling Trainer and Rowing Machine, all 3 types of aerobic and anaerobic exercises can be accomplished in the floor space used for just a single standard rowing machine.

Controlled Energy Modulation

Figure 15A:
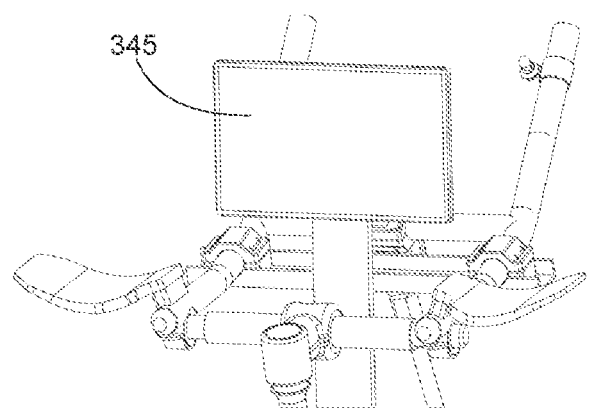
FIG. 15A is a view of an electronic screen. It broadcasts the exerciser's exercise information, bio marker data showing his level of physiologic condition at any given point during the exercise session, and recommended energy output modulation between the exerciser's at least two different muscle groups.
Figure 15B:
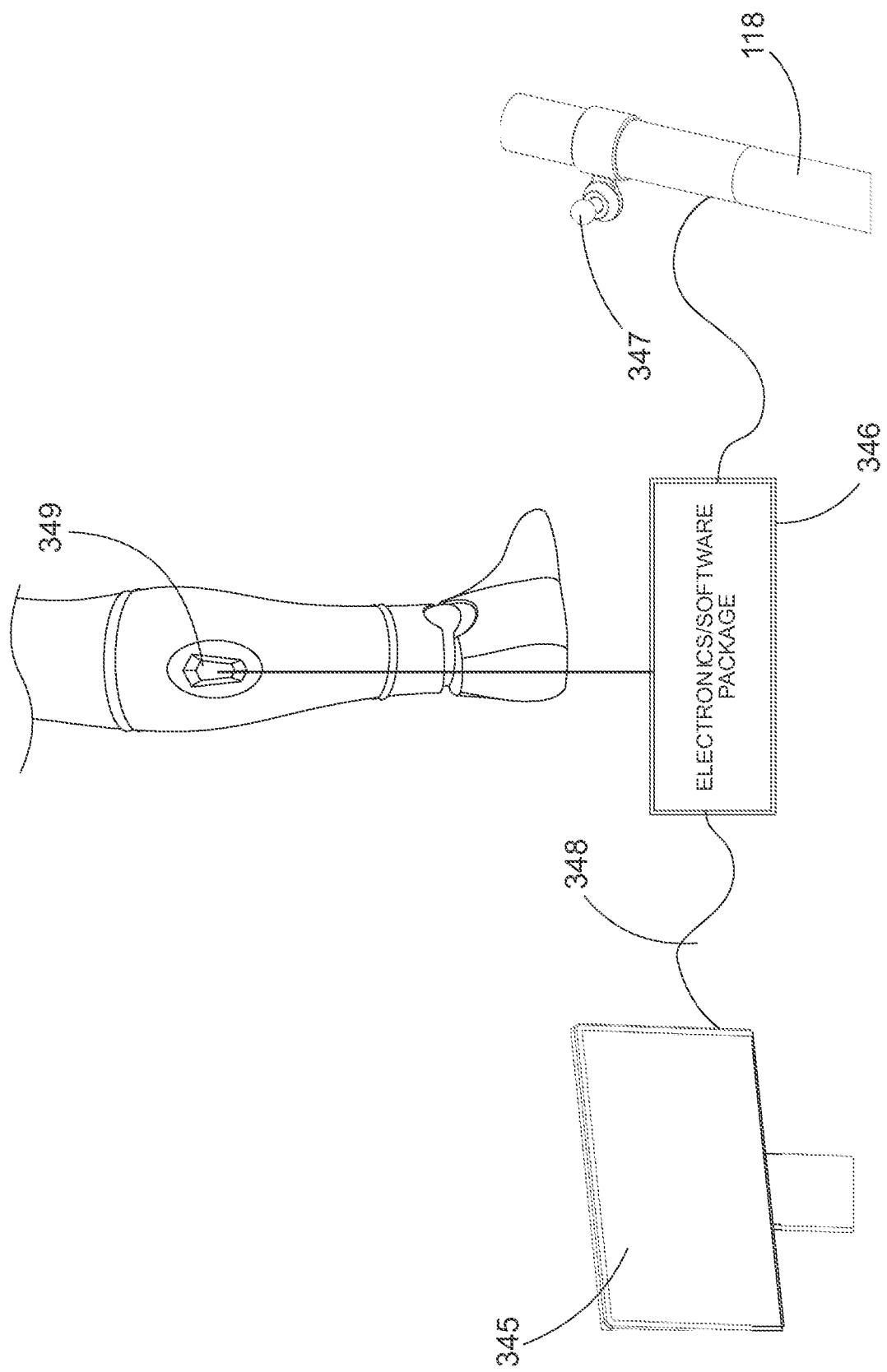
FIG. 15B is a schematic showing an example of a bio marker sensor that gathers the bio level data from the exerciser's physiologic condition, a server or databank that holds the bio marker data library and processes the new bio marker data as it is read contemporaneously from the rider, and display screen that broadcasts to the rider the bio marker data processing results and recommended modulation of energy (watts) output that the rider should implement between his at least two different muscle groups to optimize his exercise experience for this activity.

FIGS. 15A-15B depict a compilation of equipment that receives, transmits, and processes data. Electronic screen 345 operates to display exercise information and contemporaneous bio marker readings from a bio marker sensor 349 coupled to the rider that are collected and transmitted to a bio marker data bank storage 346 having a processor. In some embodiments, the bio marker data bank storage 346 is a computing device. A connection may be established between the databank storage 346 and the display 345 allowing the data bank storage 346 to process data and send instruction to the display 345 to display certain information through a user interface viewable on the display. The system operates to calculate the rider's optimum amount of energy (Watts) that the exerciser should modulate between at least two different muscle groups; plus antennae or other means for wireless radio transmission and receiving data, and modulation recommendations for energy (watts) output between the exerciser's at least two different muscle groups, as requested by the exerciser at any given point on the exercise session. As an example, the incremental differential between the total number of watts created when the rider uses at least two muscle groups to power the exercise system as opposed to just his legs is approximately sixteen percent (16%). This example, from one specific rider, represents one of the classifications of data which the computing device can use in calculating the number of watts the rider should be delivering from one muscle group such as only his legs, or simultaneously in at least two muscle groups such as both his arms and legs together to optimize the cyclist's best exercise performance. This may be utilized for the rider/exerciser to reach his goal, such as, but not limited to, to finish a particular virtual trek or pass other riders depicted in the virtual trek displayed on electronic display 345.

The computing device 346 may include but is not limited to: a radio to receive and transmit data, data storage system, and processor to process such stored and newly received data within the data storage system. The computing device 346 will perform various functions including, but not limited to the following: 1) store, in a biologic, geographic, and watt output database, a library of historical biologic metrics, geographic, and watt output information for a particular exerciser or exercisers developed during prior exercising activities; 2) Store other biologic data regarding the specific exerciser gathered from the riders' prior physical exercising activities; this biologic data can include, but is not limited to: heart rate, blood pressure, oxygen uptake capacity, red blood cell count, lactate clearance and threshold, and oxygenation condition; 3) Store the geographic characteristics of prior and current treks which include for example: total elevation, number of hills, their grade and length, total surface distance of the treks, and location of the rider on the trek at specific times when asking the processor to make its muscle group modulation recommendations; 4) store the watt readings associated with each biomarker reading; 5) utilizing historical bio-marker, geographic, and relevant watt data, the processor will calculate and establish a base line of optimum watt output levels for the exerciser's various classes of muscle groups on an on-going basis; 6) contemporaneously, while various muscles are currently being exercised, biomarker sensors will measure the current condition of a given bio-marker, such as its hemoglobin oxygen concentration, heart rate, or in immediate-time levels of measured watt output; 7) the bio-sensors will wirelessly transmit this contemporaneous bio-marker data to the bio-marker library and processor, where it will be processed; 8) watt meters measuring watts on the components of the exercise apparatus will transmit their contemporaneous watt readings to the data storage bank for further processing; 9) receive relevant contemporaneous geographic data from satellites or microcell towers defining the location of the exerciser, store, and process this geographic data along with the biomarker and watt reading data; 10) based upon the processor's comparison of the base-line bio-marker and watt reading data to that gathered and stored in the database of computing device 346 of the current contemporaneous reading for that bio-marker or markers, the computing device 346 will calculate the amount of energy (watts) the participant should be delivering to the exercise apparatus from at least two different muscle groups simultaneously together, in order to optimize the exerciser's physical performance; and 11) once the processor has processed the relevant biomarker data from the exerciser, and geographic data down loaded from a satellite or micro cell, it will transmit its recommended energy (watts) output that each of the exercising and monitored sets of muscle groups should be exerting. This recommended modulation muscle output data will be transmitted to the display screen 345 on the bike (See FIG. 15A), or display screen on the surface of goggles or glasses worn by the exerciser. The recommendations may also be broadcast verbally, or by some other useful means to the exerciser. Additionally, embodiments may include an assist device, such as an electric motor, that may be operated by the computing device 346 to calculate modulation recommendations between the muscle groups of the exerciser and an assist device to cause the assist device 500 to deliver power to the exercise apparatus under a condition wherein the bio marker sensor 349 senses a bio marker reading greater than a predetermined maximum reading for that particular bio marker.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An exercising system comprising:
   an exercise apparatus comprising sensors for determining independent energy output of at least two muscle group sets of an exerciser providing independent energy output to operate the exercise apparatus,
   wherein the exercise apparatus comprises at least two inputs for receiving the independent energy output by each of the at least two muscle groups, the at least two inputs cooperatively and independently operable with infinite variability of wattage input from relevant muscles of the exerciser; and
   an electronic screen operated by a computing device, the electronic screen displaying contemporaneous bio marker readings from the exerciser, and modulation recommendations of independent energy output differentiated between each muscle group set operating the exercise apparatus, wherein: said modulation recommendations are calculated by the computing device processing baseline bio marker data stored in a database of the computing device with contemporaneous bio marker information from bio sensors operatively coupled to the computing device that measure bio marker information of the exerciser and independent energy output of each muscle group set measured by the sensors, wherein the modulation recommendations are differentiated between each muscle group set by recommending a unique energy output value for each muscle group set to be delivered by each muscle group set relating to a fatigue factor of each muscle group set and goals of the exerciser.

2. The system of claim 1, wherein the at least two inputs of the exercise apparatus comprises a legs-only trainer operable by one muscle group set and a MPC drive train assembly operable by another muscle group set, wherein the legs-only trainer and the MPC drive train assembly are cooperatively and independently operable with infinite variability of wattage input from relevant muscles of the exerciser.

3. The system of claim 2, wherein the electronic screen displays modulation recommendations for energy output of the respective legs-only trainer and MPC drive train assembly.

4. The system of claim 3, wherein the legs-only trainer comprises a resistance device and the MPC drive train assembly comprises a resistance device, wherein resistance of each of the legs-only trainer and the MPC drive train are independently adjustable.

5. The system of claim 4, wherein the computer operating the electronic display screen is coupled to the resistance device of the legs-only trainer and the resistance device of the MPC drive train and automatically adjusts the modulation recommendation of energy from monitored muscle group sets required to operate the exercise apparatus for optimal physical fitness of the exerciser or exercising goal of the exerciser, and to provide the exerciser's optimal physical performance or exercising goal with the respective resistance devices.

6. The system of claim 5, wherein the goals of the exerciser comprise completing a virtual riding experience on a particular virtual trek or defined exercise program.

7. The system of claim 2, wherein the legs-only trainer comprises a legs-only upright stationary cycling trainer, a recumbent legs-only stationary cycling trainer, or a bicycle.

8. The system of claim 1, wherein the exercise apparatus is convertible between a first form and a second form, wherein the first form comprises a legs-only recumbent stationary cycling trainer with a MPC drive train assembly, and the second form comprises a rowing machine.

9. The system of claim 8, wherein:
   the exercise apparatus in the first form includes the recumbent stationary cycling trainer operable by one muscle group set and the MPC drive train assembly operable by another muscle group set, wherein the recumbent stationary cycling trainer and the MPC drive train assembly are cooperatively and independently operable with infinite variability of wattage input from relevant muscles of the exerciser; and
   the exercise apparatus in the second form includes the rowing machine operable with infinite variability of wattage input from relevant muscles of the exerciser to operate the rowing machine.

10. The system of claim 9, wherein the electronic screen displays modulation recommendations for energy output of the respective muscle group sets to operate the exercise apparatus as the first form of recumbent stationary cycling trainer with MPC drive train assembly or as the second form of rowing machine.

11. The system of claim 10, wherein the exercise apparatus in the first form includes the recumbent stationary cycling trainer comprising a cycling resistance device with the MPC drive train assembly comprising an independent resistance device, and wherein the exercise apparatus in the second form includes the rowing machine comprising a single resistance device.

12. The system of claim 11, wherein the computer operating the electronic display screen is coupled to the resistance device of the recumbent cycling trainer and the resistance device of the MPC drive train assembly and automatically adjusts the modulation recommendation of energy from monitored muscle group sets required to operate the exercise apparatus for optimal physical fitness of the exerciser or exercising goal of the exerciser, and to provide the exerciser's optimal physical performance or exercising goal with the respective resistance devices.

13. The system of claim 11, wherein the computer operating the electronic display screen is coupled to the resistance device of the rowing machine and automatically adjusts the modulation recommendation of energy from monitored muscle group sets required to operate the rowing machine for optimal physical fitness of the exerciser or exercising goal of the exerciser, and to provide the exerciser's optimal physical performance or exercising goal with the resistance device.

* * * * *